US010509178B1

(12) United States Patent
Tran et al.

(10) Patent No.: US 10,509,178 B1
(45) Date of Patent: Dec. 17, 2019

(54) FIBER OPTIC ADAPTER ASSEMBLIES INCLUDING A SELECTIVELY LOCKABLE ADAPTER MEMBER

(71) Applicant: CORNING RESEARCH & DEVELOPMENT CORPORATION, Corning, NY (US)

(72) Inventors: Hieu Vinh Tran, Charlotte, NC (US); Michael Wimmer, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/118,770

(22) Filed: Aug. 31, 2018

(51) Int. Cl.
G02B 6/38 (2006.01)

(52) U.S. Cl.
CPC ......... *G02B 6/3825* (2013.01); *G02B 6/3887* (2013.01)

(58) Field of Classification Search
None
See application file for complete search history.

(56) References Cited

U.S. PATENT DOCUMENTS

| 7,686,519 | B2 | 3/2010 | Lu |
| 9,213,147 | B2 | 12/2015 | Mitchell et al. |
| 9,513,444 | B2 | 12/2016 | Barnette, Jr. et al. |
| 2007/0025677 | A1* | 2/2007 | Harrison ............ G02B 6/4471 385/138 |
| 2009/0097799 | A1* | 4/2009 | Sakurai ............... G02B 6/3821 385/60 |
| 2016/0202428 | A1 | 7/2016 | Grinderslev |
| 2017/0212312 | A1 | 7/2017 | Tong et al. |

* cited by examiner

*Primary Examiner* — Michael Stahl
(74) *Attorney, Agent, or Firm* — Michael E. Carroll, Jr.

(57) ABSTRACT

An optical adapter assembly includes a mounting member and an adapter member selectively coupled to the mounting member, the adapter member including an adapter housing extending in the longitudinal direction, a jacket engagement member that is selectively positionable within the fiber insertion path and that is structurally configured to engage an outer jacket of a fiber optic cable positioned within the fiber insertion path, a sleeve positioned at least partially within the adapter housing and extending around the fiber insertion path, and a mounting member engagement portion that is engaged with the mounting member and that restricts movement of the adapter member with respect to the mounting member in the longitudinal direction.

41 Claims, 23 Drawing Sheets

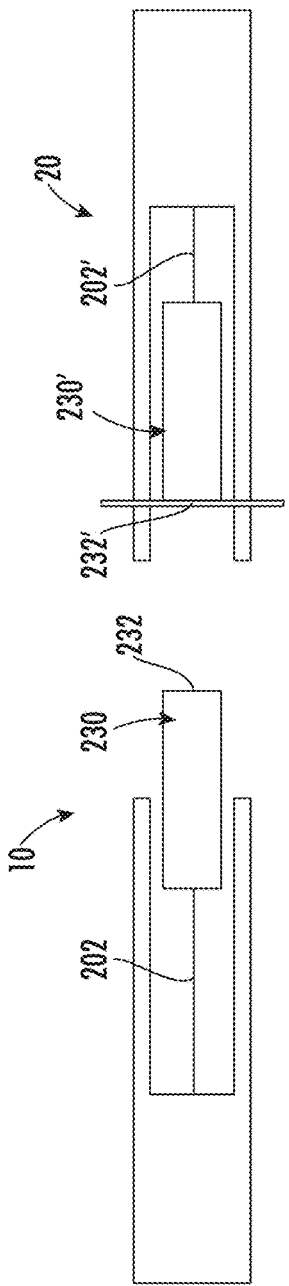
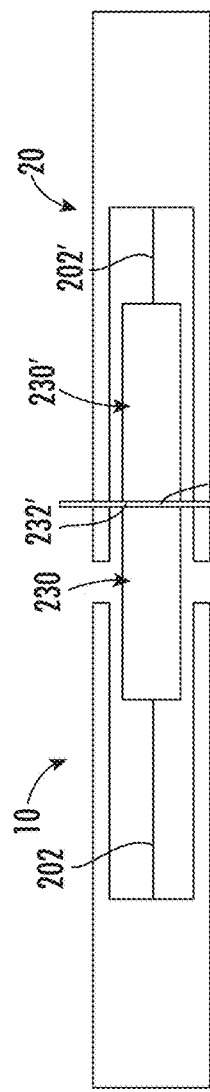
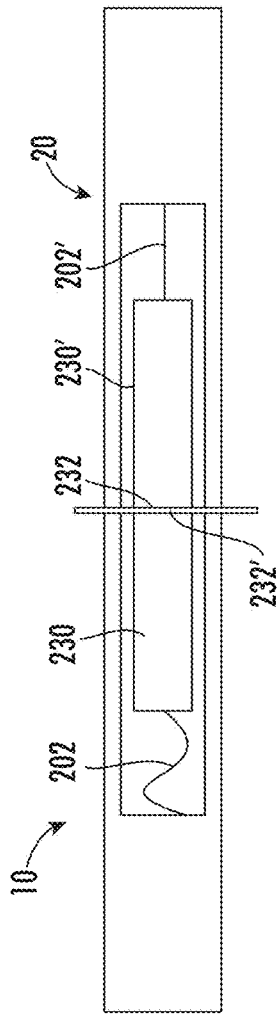
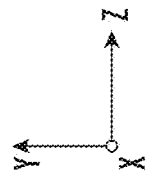

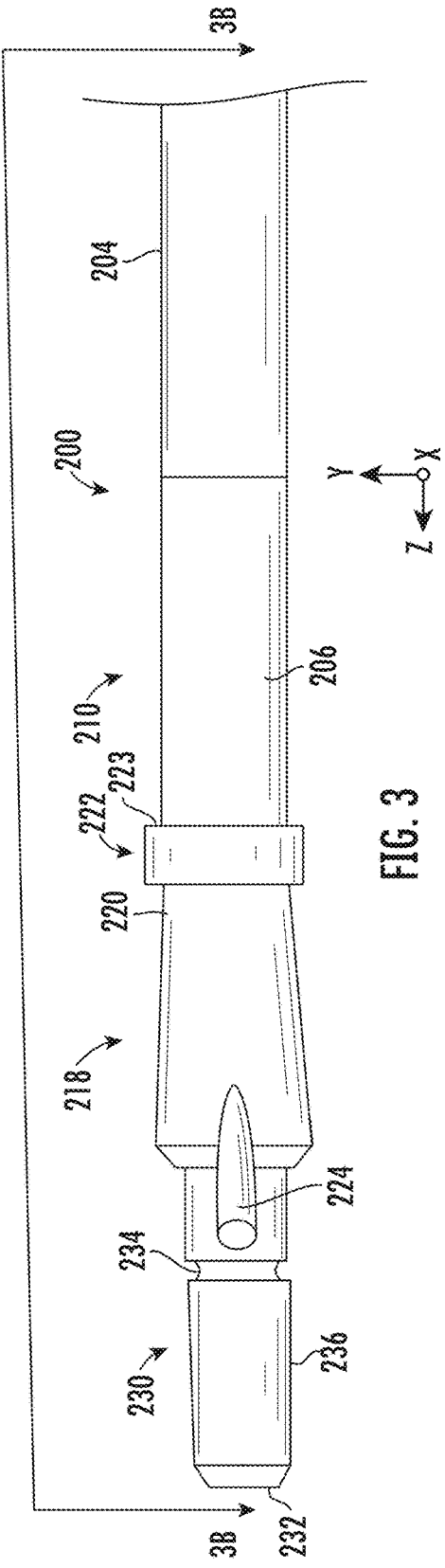
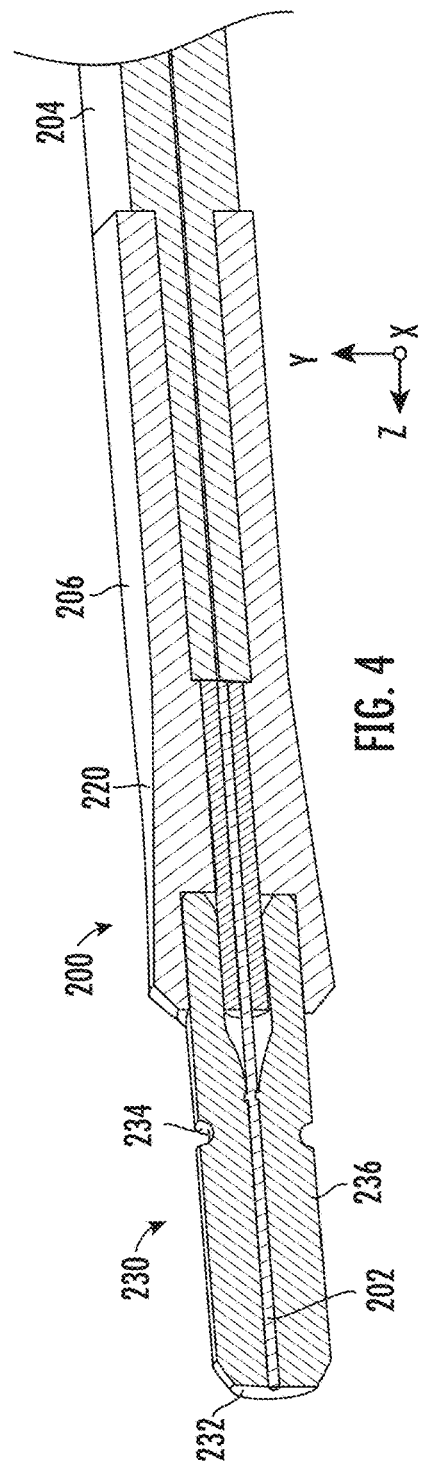

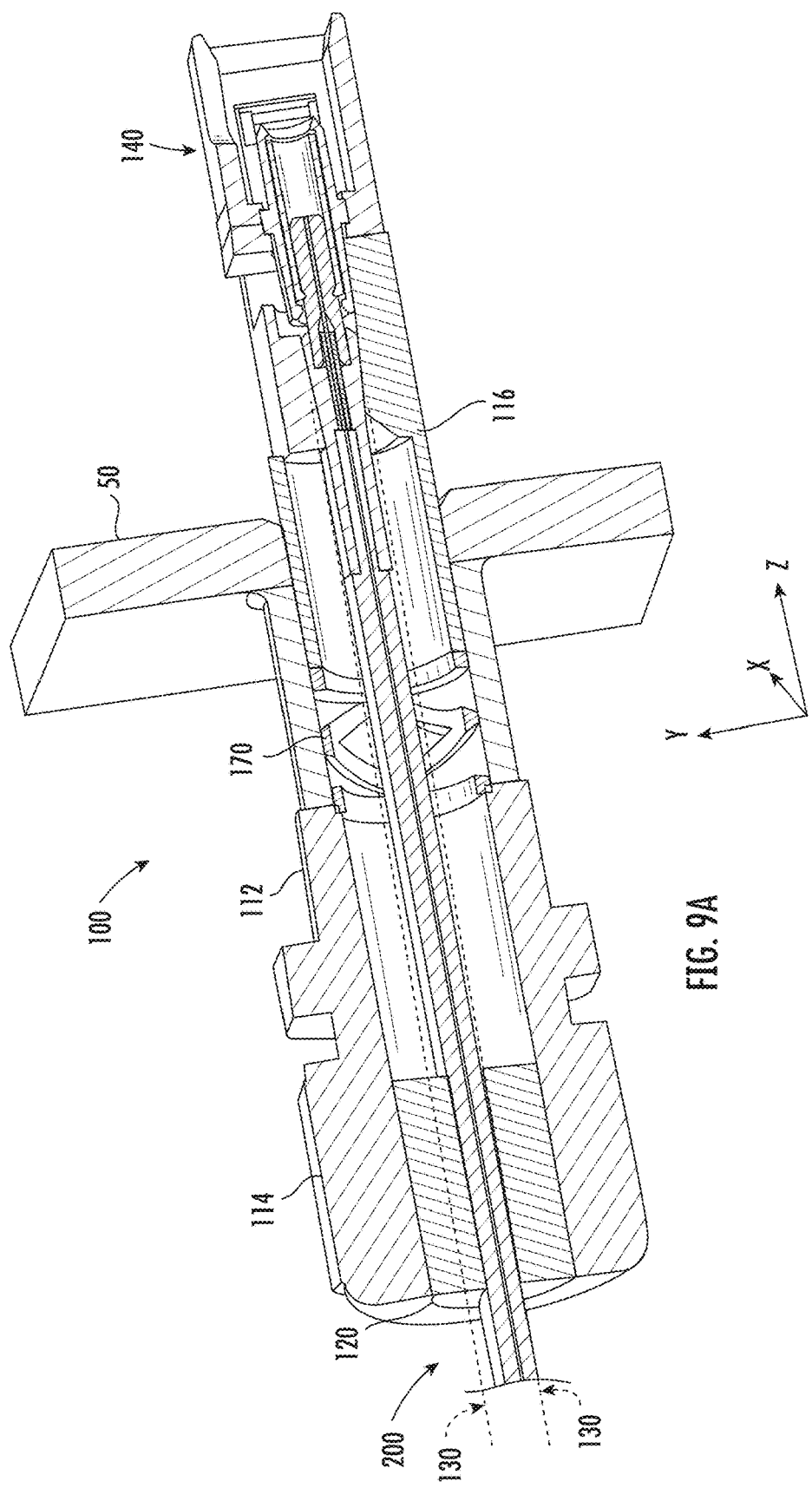

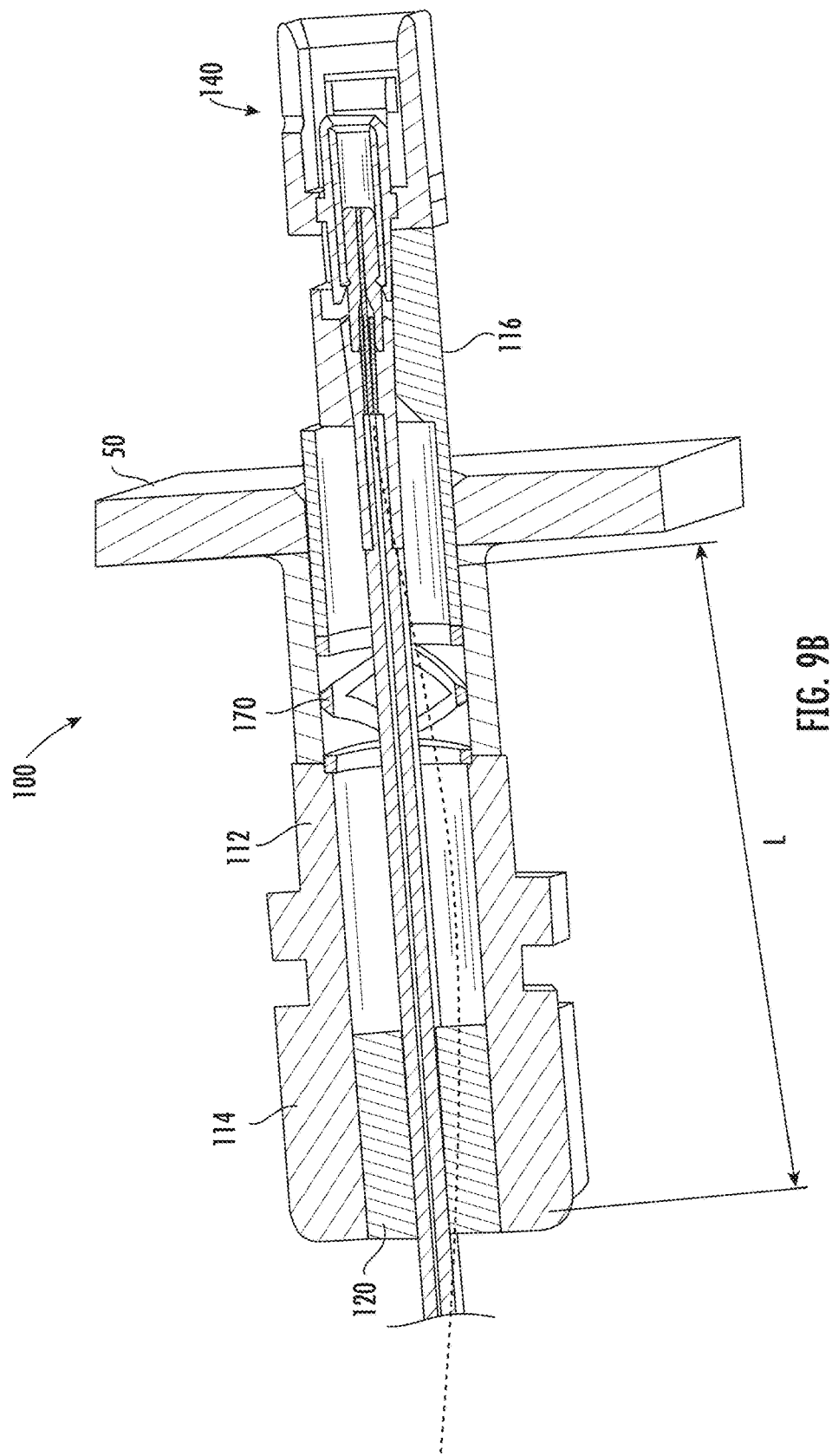

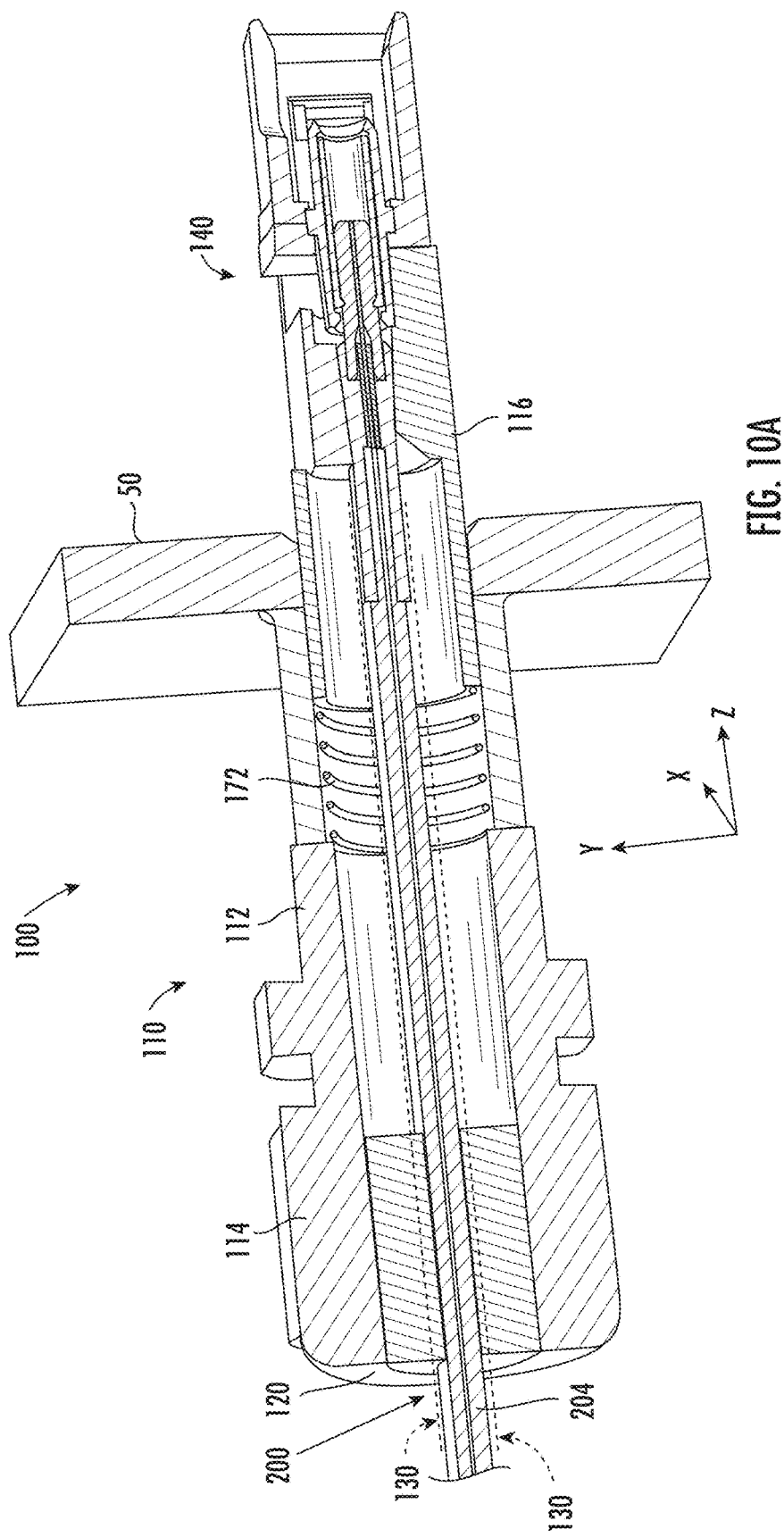

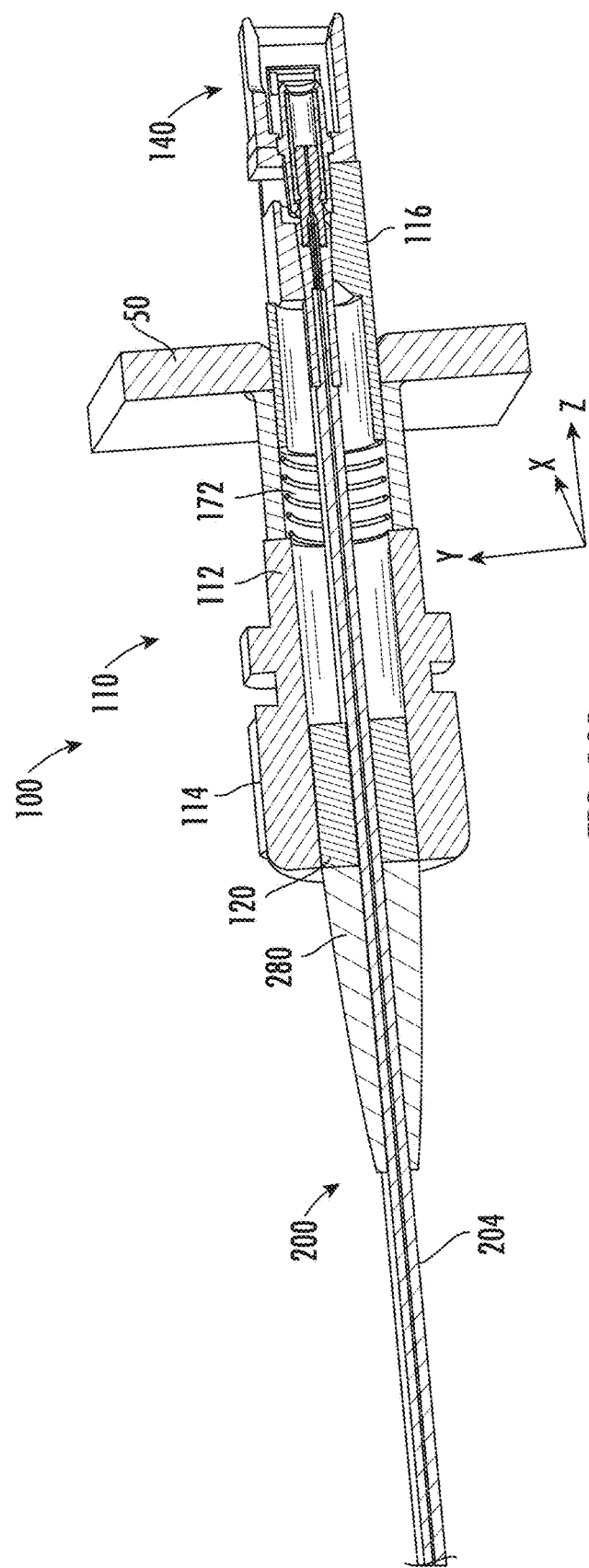

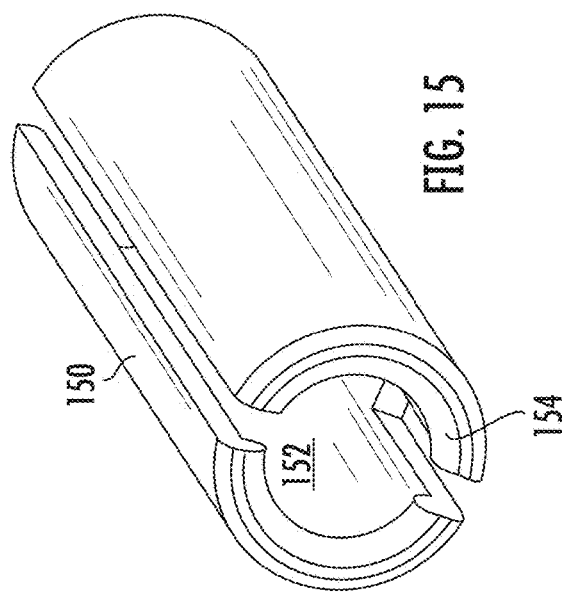
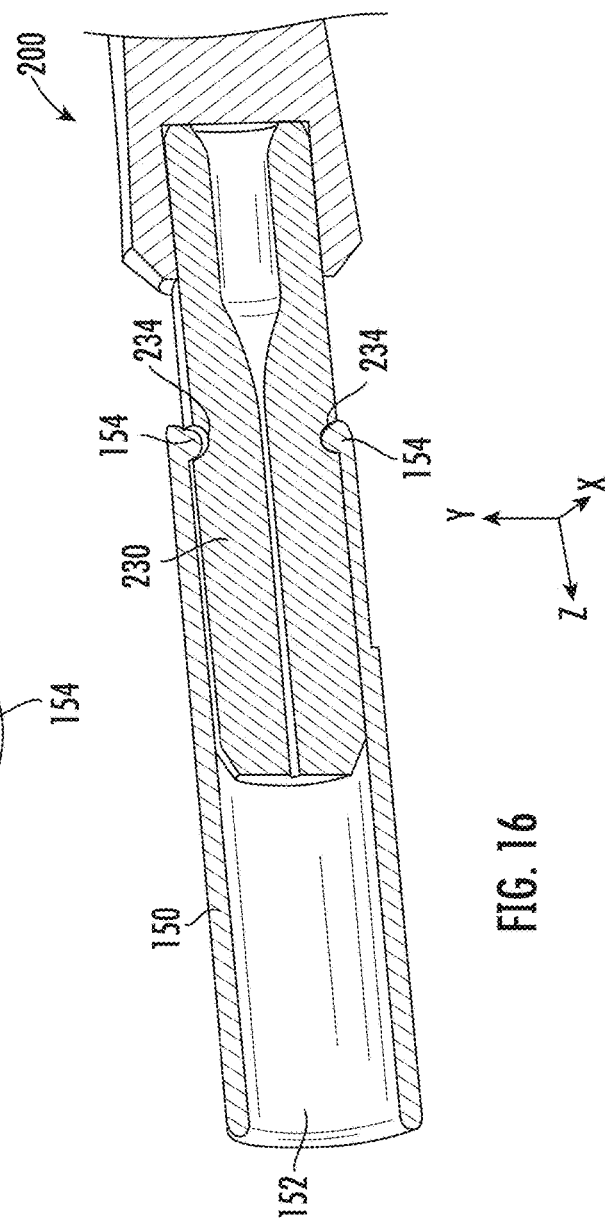

FIBER OPTIC ADAPTER ASSEMBLIES INCLUDING A SELECTIVELY LOCKABLE ADAPTER MEMBER

FIELD

The present disclosure relates generally relates to fiber optic adapter assemblies for connecting optical fibers and, more particularly, to fiber optic adapter assemblies including an adapter member that is selectively lockable to a fiber optic cable.

TECHNICAL BACKGROUND

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx).

In these initiatives, optical fibers are optically coupled to one another at various locations using fiber optic connectors. In some conventional configurations, opposing optical fibers are connected using fiber optic connectors having ferrules that are physically engaged with one another to optically couple the optical fibers to one another. In these configurations, force must be applied between the ferrules to maintain an appropriate optical connection at the mating ferrules. However, in conventional configurations, it may be difficult to reliably maintain the force necessary to make an appropriate optical connection between the optical fibers positioned within the opposing ferrules.

Accordingly, a need exists for optical adapter assemblies that manage the force applied between opposing ferrules optically connecting opposing optical fibers.

SUMMARY

In one embodiment, an optical adapter assembly includes a mounting member including a mounting housing extending in a longitudinal direction and defining a fiber insertion path that extends in the longitudinal direction, and an adapter member selectively coupled to the mounting member, the adapter member including an adapter housing extending in the longitudinal direction, a jacket engagement member that is selectively positionable within the fiber insertion path and that is structurally configured to engage an outer jacket of a fiber optic cable positioned within the fiber insertion path, a sleeve positioned at least partially within the adapter housing and extending around the fiber insertion path, and a mounting member engagement portion that is engaged with the mounting member and that restricts movement of the adapter member with respect to the mounting member in the longitudinal direction.

In another embodiment, a fiber optic junction includes a fiber optic cable including an outer jacket, an optical fiber positioned at least partially within the outer jacket, and a ferrule positioned at an end of the optical fiber, where the ferrule extends around the optical fiber, and an optical adapter assembly including a mounting member including a mounting housing extending in a longitudinal direction and defining a fiber insertion path that extends in the longitudinal direction and around at least a portion of the fiber optic cable, and an adapter member selectively coupled to the mounting member, the adapter member including an adapter housing extending in the longitudinal direction, a jacket engagement member that is selectively engagable with the outer jacket of the fiber optic cable, a sleeve positioned at least partially within the adapter housing and extending around the ferrule of the fiber optic cable, and a mounting member engagement portion that is engaged with the mounting member and that restricts movement of the adapter member with respect to the mounting member in the longitudinal direction.

In yet another embodiment, a method for forming a fiber optic junction includes inserting a fiber optic cable along a fiber insertion path of a mounting member including an annular grommet positioned around the fiber insertion path, engaging an outer jacket of the fiber optic cable with a stop member of the mounting member, where the stop member restricts further insertion of the fiber optic cable along the fiber insertion path, engaging a rotationally discrete alignment portion of the fiber optic cable with a rotationally discrete fiber alignment member of the mounting member positioned adjacent to the fiber insertion path, where the rotationally discrete fiber alignment member restricts rotation of the fiber optic cable with respect to the mounting member about a longitudinal direction extending along the fiber insertion path, engaging the outer jacket of the fiber optic cable with a jacket engagement member of an adapter member that restricts movement of the outer jacket of the fiber optic cable with respect to the adapter member in the longitudinal direction, and engaging a mounting member engagement portion of the adapter member with the mounting member to restrict movement of the adapter member with respect to the mounting member in the longitudinal direction.

Additional features of optical adapter assemblies and methods for assembling optical adapter assemblies described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1A schematically depicts a side view of a male ferrule being inserted to a female ferrule, according to one or more embodiments shown and described herein;

FIG. 1B schematically depicts a side view of the male ferrule of FIG. 1A engaged with the female ferrule of FIG. 1A, according to one or more embodiments shown and described herein;

FIG. 1C schematically depicts a side view of the male ferrule of FIG. 1A compressed against the female ferrule of FIG. 1A, according to one or more embodiments shown and described herein;

FIG. 3 schematically depicts a fiber optic cable for use with the optical adapter assembly of FIG. 2A, according to one or more embodiments shown and described herein:

FIG. 4 schematically depicts a cross-section of the fiber optic cable of FIG. 3 along section 3B-3B4, according to one or more embodiments shown and described herein;

FIG. 9A schematically depicts a cross-section of another mounting member including an elastic member, according to one or more embodiments shown and described herein;

FIG. 9B schematically depicts another cross-section of the mounting member of FIG. 9A, according to one or more embodiments shown and described herein;

FIG. 10A schematically depicts a cross-section of another mounting member including an resilient member, according to one or more embodiments shown and described herein;

FIG. 10B schematically depicts a cross-section of another optical adapter assembly including a cable bending support, according to one or more embodiments shown and described herein;

FIG. 15 schematically depicts a sleeve of the adapter member of FIG. 13 shown in isolation, according to one or more embodiments shown and described herein:

FIG. 16 schematically depicts a cross-section of the sleeve of FIG. 15 coupled to a ferrule of a fiber optic cable, according to one or more embodiments shown and described herein;

DETAILED DESCRIPTION

Figure 2A:
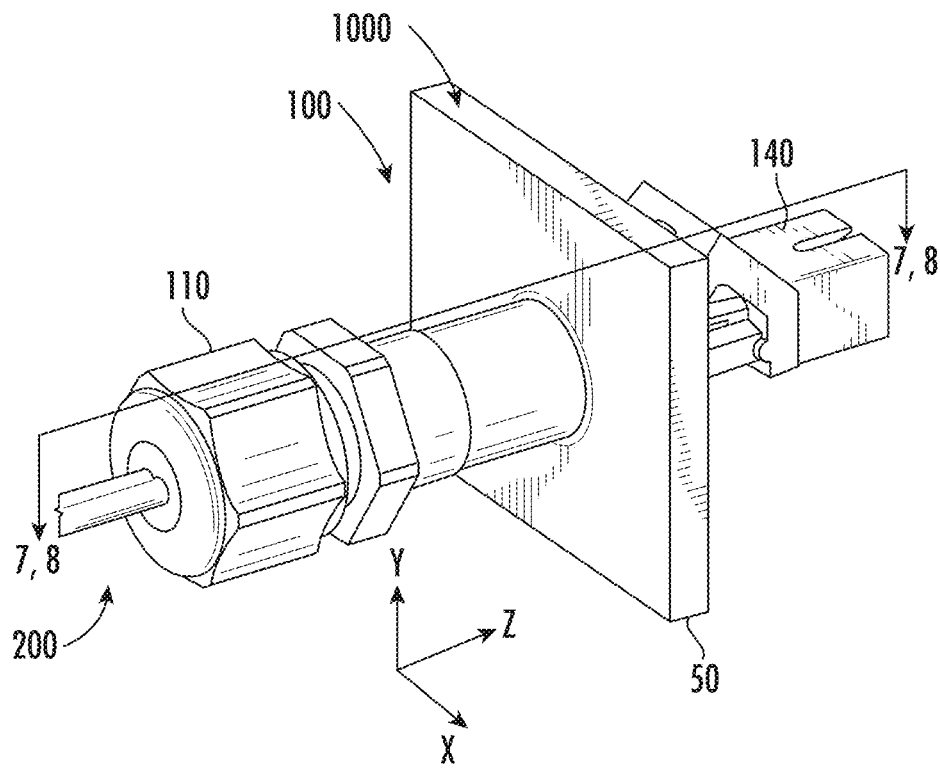
FIG. 2A schematically depicts a front perspective view of an optical adapter assembly including a mounting member and an adapter member selectively coupled to the mounting member, according to one or more embodiments shown and described herein.

Reference will now be made in detail to embodiments of optical adapter assemblies, examples of which are illustrated in the accompanying drawings. Whenever possible, the same reference numerals will be used throughout the drawings to refer to the same or like parts. Embodiments described herein are directed to optical adapter assemblies according to the present disclosure generally include a mounting member and an adapter member that is selectively coupled to the mounting member. The adapter member may be selectively coupled to a fiber optic cable positioned within the mounting member and may restrict movement of the fiber optic cable with respect to the mounting member in a longitudinal direction. Because the adapter member restricts movement of the fiber optic cable within the mounting member in the longitudinal direction, engagement forces applied to the fiber optic cable by a second fiber optic cable optically coupled to the fiber optic cable within the mounting member may be managed. Various embodiments of optical adapter assemblies will be described herein with specific reference to the appended drawings.

As used herein, the term "longitudinal direction" refers to the forward-rearward direction of the components of the optical adapter assembly (i.e., in the +/−Z-direction as depicted). The term "lateral direction" refers to the cross-wise direction of the components of the optical adapter assembly (i.e., in the +/−X-direction as depicted), and is transverse to the longitudinal direction. The term "vertical direction" refers to the upward-downward direction of the components of the optical adapter assembly (i.e., in the +/−Y-direction as depicted).

Referring initially to FIGS. 1A-IC, a side view of a male optical connector 10 is schematically depicted being optically coupled to a female optical connector 20. The male optical connector 10 and the female optical connector 20 each include a ferrule 230, 230' and an optical fiber 202, 202' extending through their respective ferrules 230, 230'. To optically couple the optical fibers 202, 202' of the male optical connector 10 and the female optical connector 20, the end faces 232, 232' of the ferrules 230, 230' are engaged with one another (i.e., physical contact).

As shown in FIG. 1C, a force is applied to the male optical connector 10 in an axial direction extending through the male optical connector 10 to ensure engagement between the end faces 232, 232' of the ferrules 230, 230' of the male optical connector 10 and the female optical connector 20. In the embodiment depicted in FIG. 1C, the male optical connector 10 is structurally configured to allow the optical fiber 202 to buckle in the axial direction, and the ferrule 230 is movable in the axial direction within the male optical connector 10. Because the ferrule 230 is movable in the axial direction, the male optical connector 10 may manage the stress on the ferrules 230, 230' of the male optical connector 10 and the female optical connector 20 resulting from the engagement between the ferrules 230, 230'.

By contrast, the ferrule 230' is generally rigidly positioned within the female optical connector 20, such that the optical fiber 202' does not buckle when the ferrule 230' of the female optical connector 20 is engaged with the ferrule 230 of the male optical connector 10. By rigidly positioning the ferrule 230' within the female optical connector 20, the stress and the engagement force between the ferrules 230, 230' may be more consistent as compared to engagement between ferrules 230 of a pair of male optical connectors 10 in which both of the ferrules 230 of the male optical connectors 10 are movable in the axial direction. However, as compared to configurations that form optical connections utilizing a pair of male optical connectors 10, interoperability is reduced. For example, it is not feasible to connect a pair of female optical connectors 20 as the ferrules 230' are both rigidly attached to the female optical connectors 20.

Figure 2B:
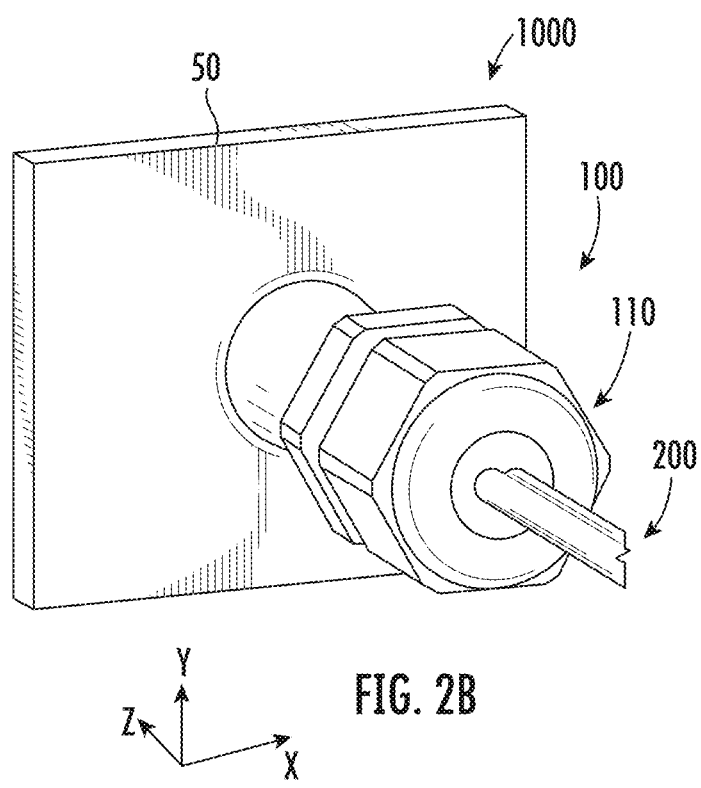
FIG. 2B schematically depicts a rear perspective view of the optical adapter assembly of FIG. 2A, according to one or more embodiments shown and described herein.

Referring collectively to FIGS. 2A and 2B, a front perspective view and a rear perspective view of an optical adapter assembly 100 is schematically depicted. The optical adapter assembly 100 generally includes a mounting member 110 and an adapter member 140 selectively coupled to the mounting member 110. A fiber optic cable 200 is inserted into the mounting member 110 and the adapter member 140 in the longitudinal direction, and the mounting member 110 and the adapter member 140 may restrict movement of the fiber optic cable 200 in the longitudinal direction such that the fiber optic cable 200 behaves like a female optical connector 20 (FIG. 1A), as described in greater detail herein.

Referring collectively to FIGS. 3 and 4, a side view and a section view of the fiber optic cable 200 along section 3B-3B of FIG. 3 are schematically depicted, respectively. The fiber optic cable 200 generally includes an optical fiber 202 that extends through the fiber optic cable 200 in the longitudinal direction. In some embodiments, the fiber optic cable 200 may further include strengthening elements extending along the fiber optic cable 200 in the longitudinal direction, such as glass reinforced plastic or the like, to restrict bending of the fiber optic cable 200. Fiber optic cables 200 may have other strength elements such as tensile yarns or the like. Furthermore, while the embodiment depicted in FIGS. 3 and 4 includes a single optical fiber 202, it should be understood that the fiber optic cable 200 may include multiple optical fibers.

In embodiments, the fiber optic cable 200 includes a ferrule 230 that is positioned at a terminal end of the optical fiber 202, the ferrule 230 extending around the optical fiber 202. The fiber optic cable further includes an outer jacket 206 that extends around the optical fiber 202, and may include a coating 204 positioned rearward of the outer jacket 206 in the longitudinal direction (i.e., in the −z-direction as depicted).

The ferrule 230 includes an end face 232 that is generally oriented to face in the longitudinal direction and that is structurally configured to engage an end face of another ferrule to assist in optically coupling the optical fiber 202 to another optical fiber. The ferrule 230 further includes an outer perimeter 236 that extends around the ferrule 230 about the longitudinal direction, and a sleeve engagement portion 234 positioned on the outer perimeter 236 of the ferrule 230. The sleeve engagement portion 234 is structurally configured to engage a sleeve of the adapter member 140 (FIG. 2A), as described in greater detail herein. In the embodiment depicted in FIGS. 3 and 4, the sleeve engagement portion 234 comprises a groove that extends inward into the outer perimeter 236 of the ferrule 230. In other embodiments, the sleeve engagement portion 234 may extend outward from the outer perimeter 236 of the ferrule 230.

The outer jacket 206 of the fiber optic cable 200 generally includes an interface portion 218, and a cable transition portion 210 positioned rearward of the interface portion 218. The interface portion 218 engages the mounting member 110 (FIG. 2A) as described in greater detail herein. The cable transition portion 210 is generally positioned between the interface portion 218 of the outer jacket 206 and a coating 204 of the fiber optic cable 200 positioned rearward from the outer jacket 206. In the embodiment depicted in FIGS. 3 and 4, the outer jacket 206 of the fiber optic cable 200 includes a generally circular cross-section that extends around the fiber optic cable 200. In some embodiments, the interface portion 218 and/or the cable transition portion 210 may include a taper such that an outer perimeter of the interface portion 218 and/or the cable transition portion 210 may increase or decrease moving along the outer jacket 206 in the longitudinal direction. For example, in the embodiment depicted in FIG. 3, the interface portion 218 includes a taper such that the outer perimeter of the interface portion 218 generally decreases moving rearward in the longitudinal direction (i.e., in the −z-direction as depicted) along the outer jacket 206, while the cable transition portion 210 includes a generally uniform outer perimeter moving rearward in the longitudinal direction (i.e., in the −z-direction as depicted) along the outer jacket 206. In other embodiments the cable transition portion 210 may include a taper such that the outer perimeter of the cable transition portion 210 may increase or decrease moving rearward in the longitudinal direction (i.e., in the −z-direction as depicted) along the outer jacket 206. Furthermore, in other embodiments, the interface portion 218 may include a generally uniform outer perimeter, or may include a taper such that the outer perimeter of the interface portion 218 generally increases moving rearward in the longitudinal direction (i.e., in the −z-direction as depicted) along the outer jacket 206.

The outer jacket 206 generally defines a nominal portion 220 and an engagement portion 222 positioned on the nominal portion 220. The nominal portion 220 is referenced herein as being "nominal" to help distinguish it from the various distinctive surface features that are defined on the outer jacket 206. Without these distinctive surface features, the nominal portion would form a relatively uniform and continuous surface of the outer jacket 206, and would extend far enough along a length of the outer jacket 206 to provide a convenient surface for a user to handle the outer jacket 206 without the use of a specialized connector handling tool or other supplemental hardware. Reference herein to a surface feature, e.g., an engagement portion 222, that is "defined on" the nominal portion 220 of the outer jacket 206 contemplates that the surface feature may be a subtractive surface feature, like a cut-out, or an additive surface feature, like a projection, as depicted in FIG. 3.

In the embodiment depicted in FIG. 3, the engagement portion 222 defines an adapter engagement face 223 that is oriented to face in the longitudinal direction as depicted. The adapter engagement face 223 may engage the adapter member 140 (FIG. 2A) such that the fiber optic cable 200 is fixed with respect to the adapter member 140 (FIG. 2A) in the longitudinal direction, as described in greater detail herein.

The fiber optic cable 200 further includes a rotationally discrete alignment portion 224. In the embodiment depicted in FIG. 3, the rotationally discrete alignment portion 224 extends forward from the outer jacket 206 in the longitudinal direction (i.e., in the +z-direction as depicted) along the ferrule 230. In other embodiments, the rotationally discrete alignment portion 224 may be positioned solely on the outer jacket 206, or may be solely positioned on the ferrule 230. As used herein, the term "rotationally" discrete represents that the rotationally discrete alignment portion 224 extends a limited width-wise extent along the fiber optic cable 200 as the fiber optic cable 200 is rotated about the longitudinal direction. The rotationally discrete alignment portion 224 structurally configured to engage the mounting member 110 (FIG. 2A) to restrict or inhibit rotation of the fiber optic cable 200 with respect to the mounting member 110 (FIG. 2A) about the longitudinal direction, as described in greater detail herein. While the embodiment depicted in FIG. 3 schematically depicts a rotationally discrete alignment portion 224 that extends outward from the ferrule 230, it should be understood that in other embodiments, the rotationally discrete alignment portion 224 may be a subtractive feature extending inward into the ferrule 230 and/or the outer jacket 206.

Figure 5:
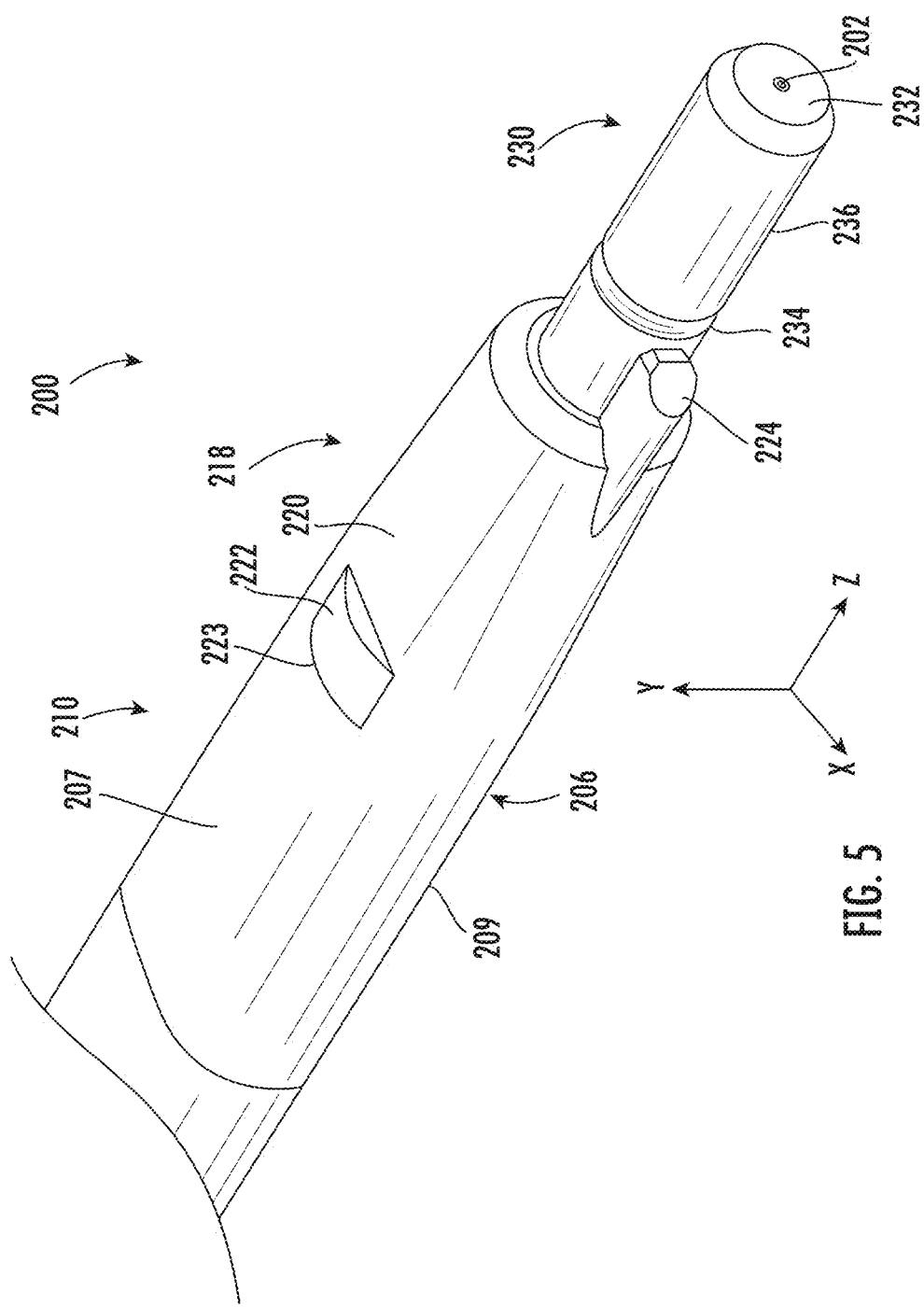
FIG. 5 schematically depicts a front perspective view of another fiber optic cable for use with the optical adapter assembly of FIG. 2A, according to one or more embodiments shown and described herein.

Referring to FIG. 5, a perspective view of another fiber optic cable 200 is schematically depicted. Similar to the embodiment depicted in FIGS. 3 and 4, the fiber optic cable 200 includes the outer jacket 206, the engagement portion 222 extending outward from the nominal portion 220, and the rotationally discrete alignment portion 224. However, in the embodiment depicted in FIG. 5, the outer jacket 206 generally defines an oval-shaped cross section, such that the outer jacket 206 defines an upper surface 207 and a lower surface 209 positioned opposite the upper surface 207. The upper surface 207 and the lower surface 209 may include generally planar surfaces that are oriented to face upward and downward in the vertical direction, respectively.

Figure 6:
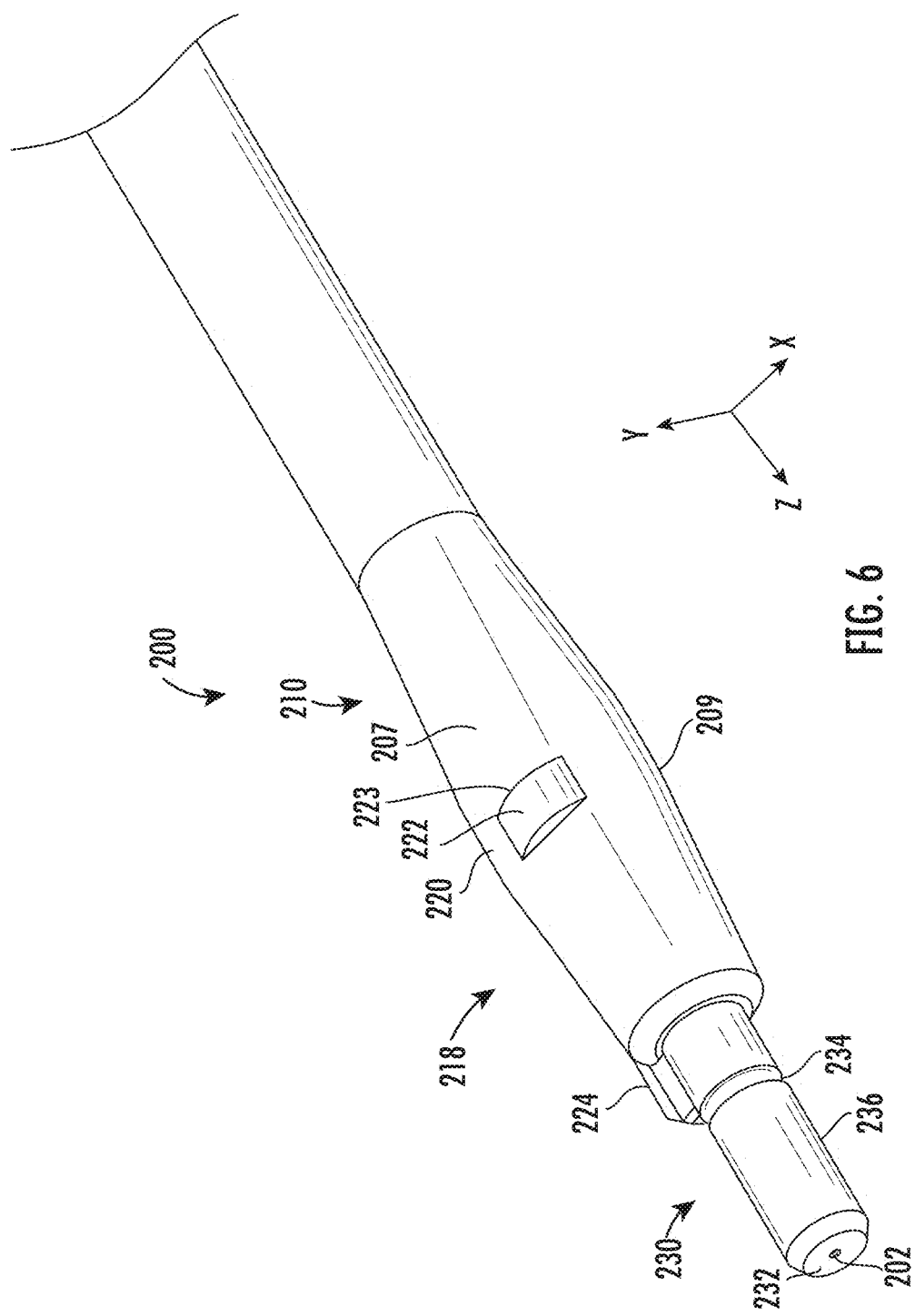
FIG. 6 schematically depicts a front perspective view of another fiber optic cable for use with the optical adapter assembly of FIG. 2A, according to one or more embodiments shown and described herein.

Referring to FIG. 6, a perspective view of another fiber optic cable 200 is schematically depicted. Similar to the embodiment depicted in FIGS. 3-5, the fiber optic cable 200 includes the outer jacket 206, the engagement portion 222 extending outward from the nominal portion 220, and the rotationally discrete alignment portion 224. Similar to the embodiment described above and depicted in FIG. 5, the outer jacket 206 generally defines an oval-shaped cross section, such that the outer jacket 206 defines an upper surface 207 and a lower surface 209 positioned opposite the upper surface 207. In the embodiment depicted in FIG. 6, the interface portion 218 and the cable transition portion 210 include a taper such that a width of the interface portion 218 evaluated in the lateral direction increases moving rearward in the longitudinal direction (i.e., in the −z-direction as depicted), and a width of the cable transition portion 210 evaluated in the lateral direction decreases moving rearward in the longitudinal direction (i.e., in the −z-direction as depicted). While in the embodiment depicted in FIG. 6, both the interface portion 218 and the cable transition portion 210 include a taper, it should be understood that in other embodiments, the interface portion 218 and/or the cable transition portion 210 may include generally uniform width evaluated in the lateral direction. Furthermore, while the embodiment depicted in FIG. 6 shows the width of the interface portion 218 evaluated in the lateral direction increasing moving rearward in the longitudinal direction (i.e., in the −z-direction as depicted), it should be understood that in other embodiments, the interface portion 218 may include a taper such that the width of the interface portion evaluated in the lateral direction decreases moving rearward in the longitudinal direction (i.e., in the −z-direction as depicted). Similarly, while the embodiment depicted in FIG. 6 shows the width of the cable transition portion 210 evaluated in the lateral direction decreasing moving rearward in the longitudinal direction (i.e., in the −z-direction as depicted), it should be understood that in other embodiments, the cable transition portion 210 may include a taper such that the width of the cable transition portion 210 evaluated in the lateral direction increases moving rearward in the longitudinal direction (i.e., in the −z-direction as depicted).

Figure 7:
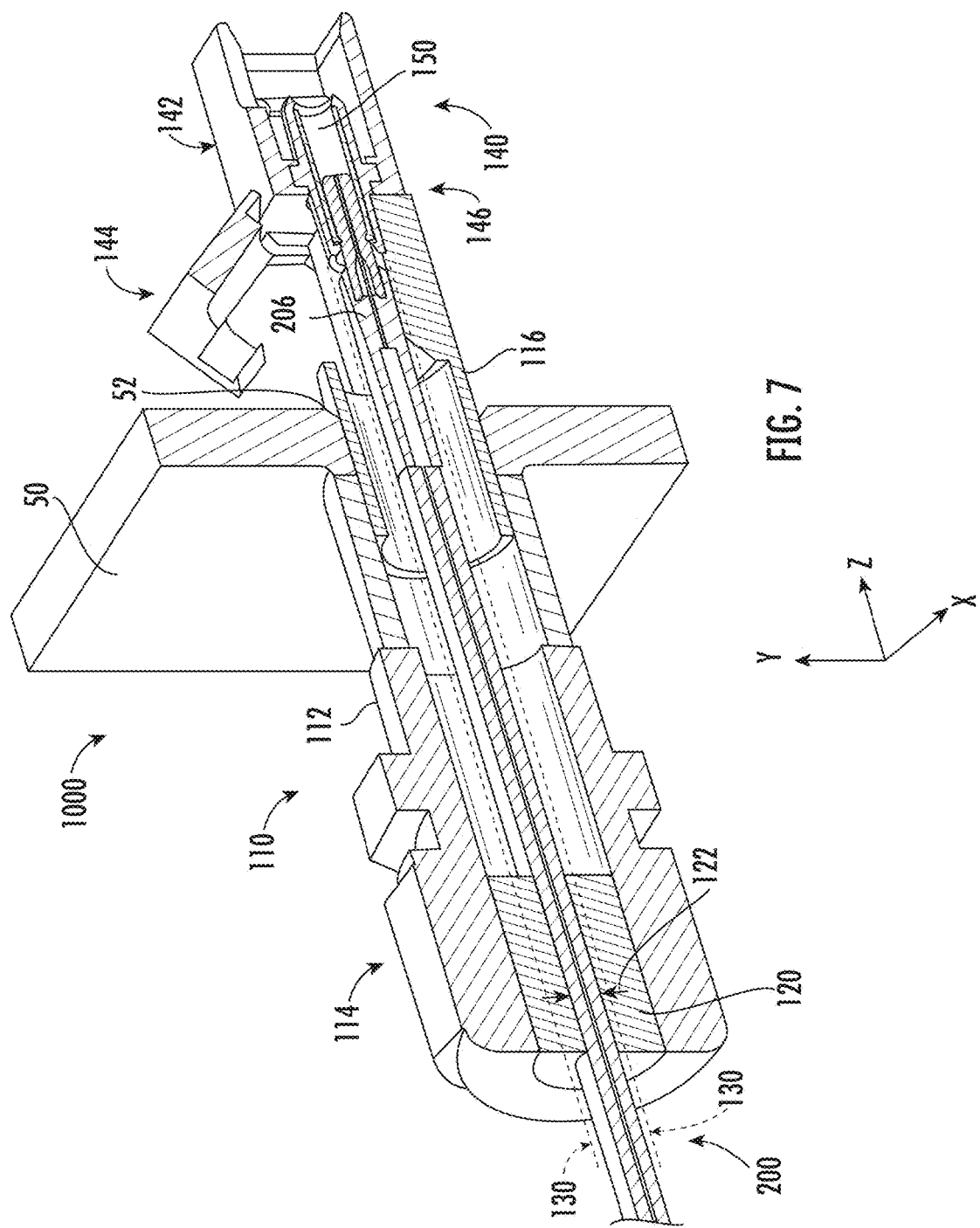
FIG. 7 schematically depicts a cross-section of the optical adapter assembly of FIG. 2A along section 7-7 of FIG. 2A, according to one or more embodiments shown and described herein.
Figure 8:
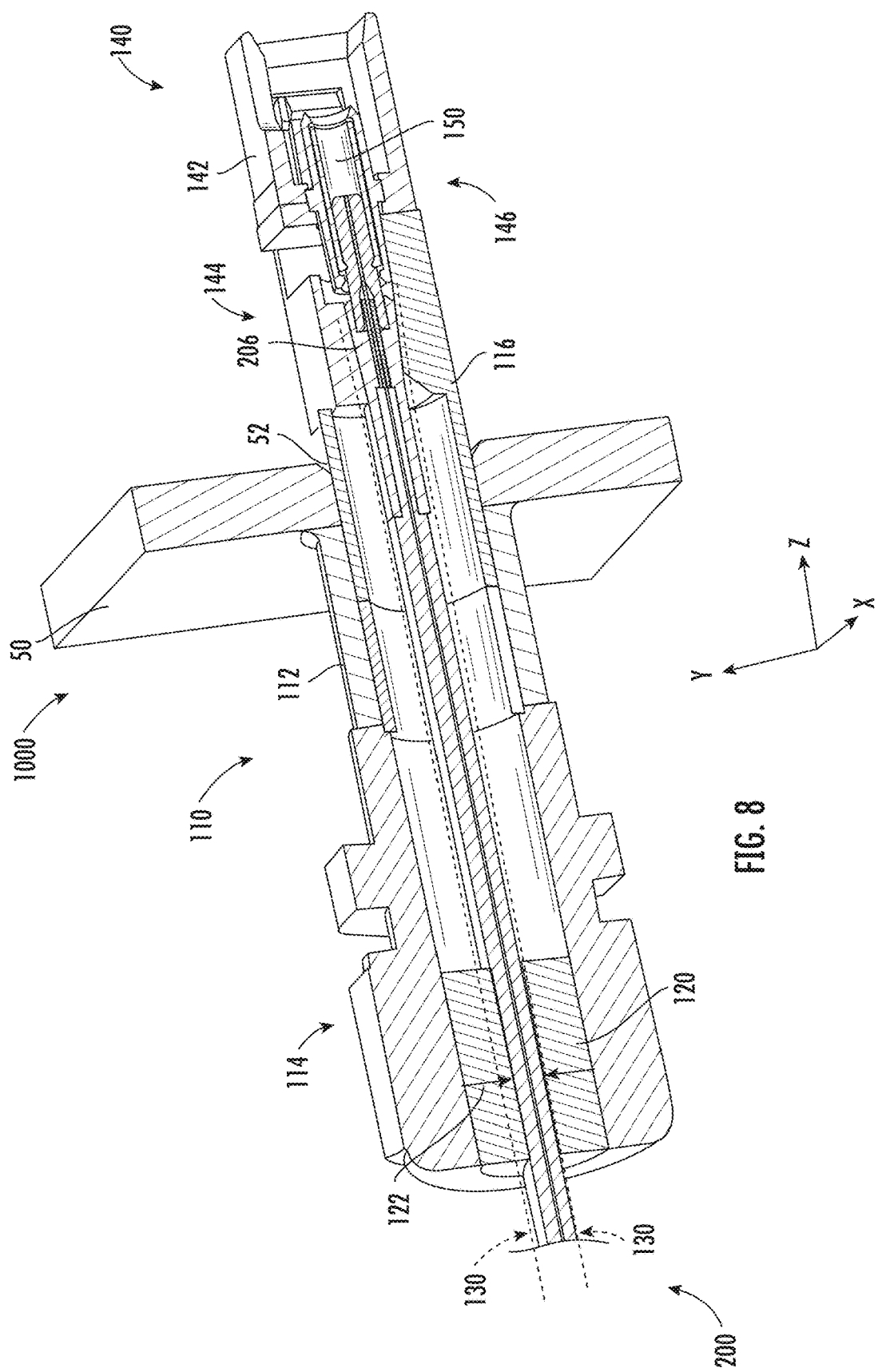
FIG. 8 schematically depicts another cross-section of the optical adapter assembly of FIG. 2A along section 8-8 of FIG. 2A with the adapter member selectively coupled to the mounting member, according to one or more embodiments shown and described herein.

Referring collectively to FIGS. 7 and 8, cross-sections of the optical adapter assembly 100 along sections 7-7 and 8-8 of FIG. 2A are schematically depicted, respectively.

The optical adapter assembly 100 includes the mounting member 110 and the adapter member 140 selectively coupled to the mounting member 110. In some embodiments, the mounting member 110 may extend through an aperture 52 of a wall 50, such that the optical adapter assembly 100 is coupled to the wall 50. In other embodiments, the optical adapter assembly 100 may be a standalone optical adapter assembly 100. With the fiber optic cable 200 inserted into the optical adapter assembly 100 and selectively coupled to the adapter member, the fiber optic cable 200 and the optical adapter assembly 100 form a fiber optic junction 1000, as depicted in FIG. 8.

The mounting member 110 includes a mounting housing 112, an annular grommet 120 positioned within the mounting housing 112, and a locking member 114 engaged with the annular grommet 120. The mounting housing 112 extends in the longitudinal direction and defines a fiber insertion path 130 that extends in the longitudinal direction. The fiber insertion path 130 generally defines the path through which the fiber optic cable 200 is inserted into the optical adapter assembly 100.

The annular grommet 120 is positioned within the mounting housing 112 and defines an inner perimeter 122 extending through the annular grommet 120 in the longitudinal direction. The inner perimeter 122 of the annular grommet 120 is positioned around the fiber insertion path 130 such that the fiber optic cable 200 extends through the inner perimeter 122 of the annular grommet 120 when installed to the optical adapter assembly 100. In embodiments the annular grommet 120 is formed of an elastically deformable material, such that the inner perimeter 122 may be increased and decreased. For example and without limitation, the annular grommet 120 may be formed of an elastic polymer, a composite, or the like.

The locking member 114 is engaged with the annular grommet 120 and is repositionable between a constricted position and an expanded position. In the constricted position, the locking member 114 constricts the annular grommet 120 such that the annular grommet 120 defines a constricted inner perimeter 122. In the expanded position, the locking member 114 may release the annular grommet 120 such that the annular grommet 120 defines a resting inner perimeter 122, where the constricted inner perimeter 122 is less than the resting inner perimeter 122. In this way the inner perimeter 122 of the annular grommet 120 may be selectively enlarged and constricted. In embodiments, the locking member 114 may be positioned in the expanded position when the fiber optic cable 200 is inserted to the optical adapter assembly 100, such that the fiber optic cable 200 may be may be inserted into the mounting member 110 in the longitudinal direction. Once the fiber optic cable 200 is positioned within the mounting member 110, the locking member 114 may be moved to the constricted position to seal the fiber optic cable 200 within mounting member 110. In embodiments, the locking member 114 may include any suitable construction to engage the annular grommet 120 and may include a screw or the like to constrict the annular grommet 120.

In some embodiments, the mounting member 110 includes a mating member 116 engaged with the adapter member 140 and positioned within the mounting housing 112. The mating member 116 may further engage the outer jacket 206 of the fiber optic cable 200. In other embodiments, that do not include the mating member 116, the adapter member 140 and the fiber optic cable 200 may directly engage the mounting housing 112.

Referring to FIGS. 9A and 9B, a cross-section of another example optical adapter assembly 100 is schematically depicted. In the embodiment depicted in FIGS. 9A and 9B, the mounting member 110 includes an elastic member 170 positioned within the mounting housing 112 between the mating member 116 and the annular grommet 120 in the longitudinal direction. The elastic member 170 may permit bending of the mounting member 110 in the vertical and the lateral directions along a bending length "L" of the mounting member 110. By permitting bending of the mounting member 110, as force is applied to the fiber optic cable 200 at positions outside of the optical adapter assembly 100, the force may be accommodated by the bending of the mounting member 110, reducing point pressure at interfaces between the fiber optic cable 200 and the mounting member 110, such as the annular grommet 120. In embodiments, the elastic member 170 may include any suitable material that elastically deforms to allow the mounting member to bend in the vertical and the lateral directions. For example and without limitation, the elastic member 170 may be formed from a polymer, a composite, a flexible metal or the like.

Referring to FIG. 10A, a cross-section of another optical adapter assembly 100 is schematically depicted. In the embodiment depicted in FIG. 10A, the mounting member 110 includes a resilient member 172 positioned within the mounting housing 112 between the mating member 116 and the annular grommet 120 in the longitudinal direction. Similar to the embodiment described above and depicted in FIGS. 9A and 9B, the resilient member 172 may permit bending of the mounting member 110 in the vertical and the lateral directions. Accordingly, the resilient member 172 may similarly permit bending of the mounting member 110 as force is applied to the fiber optic cable 200 at positions outside of the optical adapter assembly 100, reducing point pressure at interfaces between the fiber optic cable 200 and the mounting member 110, such as the annular grommet 120. In embodiments, the resilient member 172 may include any suitable construction to allow the mounting member 110 to bend in the vertical and the lateral direction. For example and without limitation, the resilient member may include a compression spring, a tension spring, a torsion spring, or the like.

Referring to FIG. 10B, in some embodiments, the fiber optic cable 200 and/or the mounting member 110 may include additional features to reduce bending of the fiber optic cable 200 in the vertical direction and the lateral direction. For example, in the embodiment depicted in FIG. 10B, a cable bending support 280 engaged with the fiber optic cable and positioned at the interface between the fiber optic cable 200 and the annular grommet 120 to reduce bending of the fiber optic cable 200 at the annular grommet 120. The cable bending support 280 may be coupled to the fiber optic cable 200 or the mounting housing 112, and may be structurally configured to elastically deform in the vertical and the lateral directions to absorb force applied to the fiber optic cable 200 in the vertical and the lateral directions. While in the embodiment shown in FIG. 10B, the cable bending support 280 includes a taper such that a thickness of the cable bending support 280 increased moving forward in the longitudinal direction (i.e., in the +z-direction as depicted), it should be understood that the cable bending support 280 may have any suitable geometry to reduce bending of the fiber optic cable 200 in the vertical and the lateral directions at the annular grommet 120. For example, in some embodiments, the cable bending support 280 may be formed as an annular structure that does not elastically deform in the vertical and the lateral directions, but rather allows and restricts a range of motion of the fiber optic cable 200 in the vertical and the lateral directions.

Figure 11:
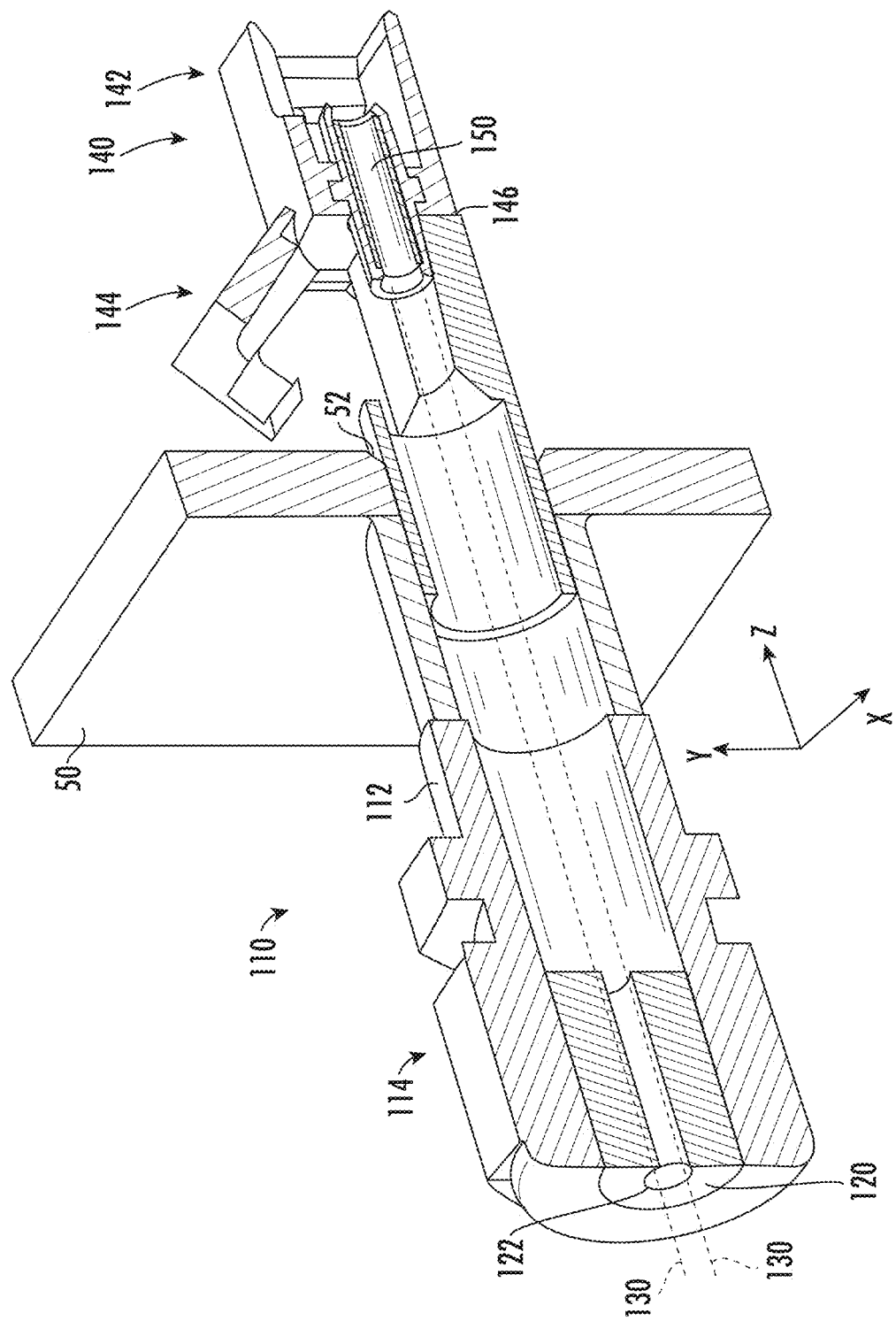
FIG. 11 schematically depicts a cross-section of the optical adapter assembly of FIG. 2A without a fiber optic cable, according to one or more embodiments shown and described herein.

Referring to FIG. 11, the optical adapter assembly 100 is schematically depicted without the fiber optic cable 200 (FIG. 8). The adapter member 140 is selectively coupled to the mounting member 110 and generally includes an adapter housing 142 that extends in the longitudinal direction, a jacket engagement member 144, and a sleeve 150 positioned at least partially within the adapter housing 142 extending around the fiber insertion path 130. In embodiments, the jacket engagement member 144 is selectively positionable within the fiber insertion path 130 to engage the outer jacket 206 (FIG. 8) of the fiber optic cable 200, as described in greater detail herein.

Figure 12:
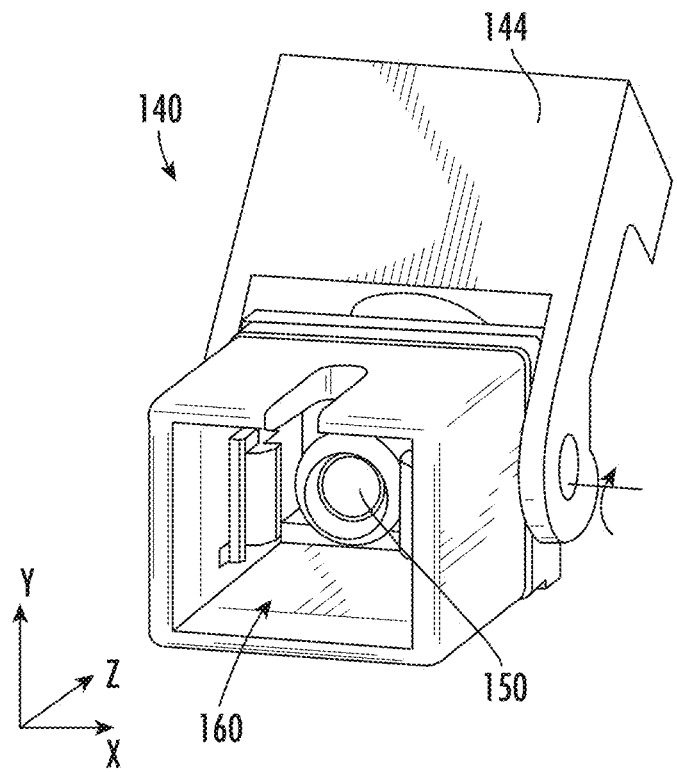
FIG. 12 schematically depicts a front perspective view of the adapter member of FIG. 2A in isolation, according to one or more embodiments shown and described herein.
Figure 13:
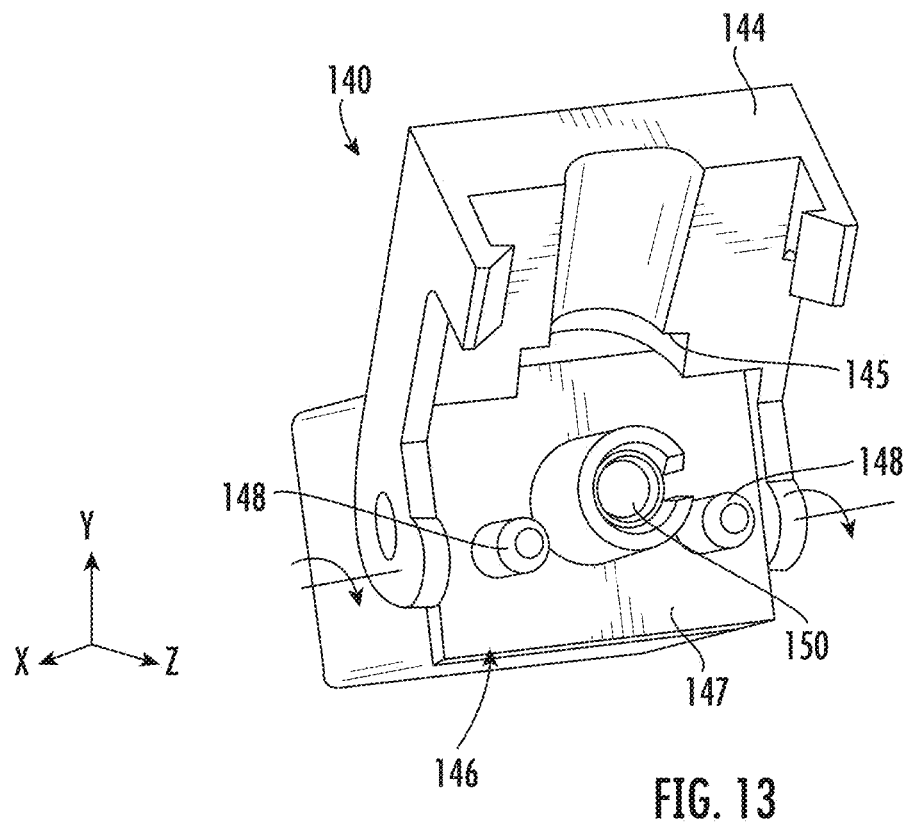
FIG. 13 schematically depicts a rear perspective view of the adapter member of FIG. 12 in isolation, according to one or more embodiments shown and described herein.

Referring collectively to FIGS. 12 and 13, a front perspective view and a rear perspective view of the adapter member 140 are shown in isolation, respectively. In embodiments, the jacket engagement member 144 is pivotally coupled to the adapter housing 142. As shown in FIG. 13, the jacket engagement member 144 defines a jacket engagement face 145 that is respositionable between an engaged position and a disengaged position as the jacket engagement member 144 pivots with respect to the adapter member 140. In the engaged position, the jacket engagement face 145 is oriented to face in the longitudinal direction and, when the adapter member 140 is selectively coupled to the mounting member 110 (FIG. 8), the jacket engagement face 145 is positioned within the fiber insertion path 130 (FIG. 8). In embodiments, the jacket engagement face 145 engages the adapter engagement face 223 (FIG. 3) of the outer jacket 206 of the fiber optic cable 200 to retain the fiber optic cable 200 within the optical adapter assembly 100 (FIG. 8), as described in greater detail herein.

The adapter member 140 further includes a mounting member engagement portion 146 that comprises an engagement face 147 that is oriented to face in the longitudinal direction. The mounting member engagement portion 146 engages the mounting member 110 (FIG. 11) and restricts movement of the adapter member 140 with respect to the mounting member 110 (FIG. 11) in the longitudinal direction when the adapter member 140 is selectively coupled to the mounting member 110 (FIG. 11).

Opposite the mounting member engagement portion 146, the adapter member 140 generally defines a receiving side 160 that is configured to receive a ferrule of a fiber optic cable that is to be optically coupled to the fiber optic cable 200 (FIG. 8), as described in greater detail herein.

In the embodiment depicted in FIG. 13, the adapter member 140 includes at least one alignment feature 148. By way of example, the at least one alignment feature 148 includes a pair of pins extending outward from the engagement face 147 of the adapter member 140, and when the adapter member 140 is selectively coupled to the mounting member 110 (FIG. 11), the pins may be inserted within corresponding holes 127 (FIG. 20B) of the mounting member 110 (FIG. 20B) such that rotation of the adapter member 140 with respect to the mounting member 110 (FIG. 11) about the longitudinal direction is restricted. In other embodiments, the at least one alignment feature 148 may include one or more holes extending into the engagement face 147 of the adapter member 140, and the mounting member 110 (FIG. 11) may include one or more pins that are inserted within the one or more holes of the at least one alignment feature 148 when the adapter member 140 is selectively coupled to the mounting member 110 (FIG. 11).

Figure 14:
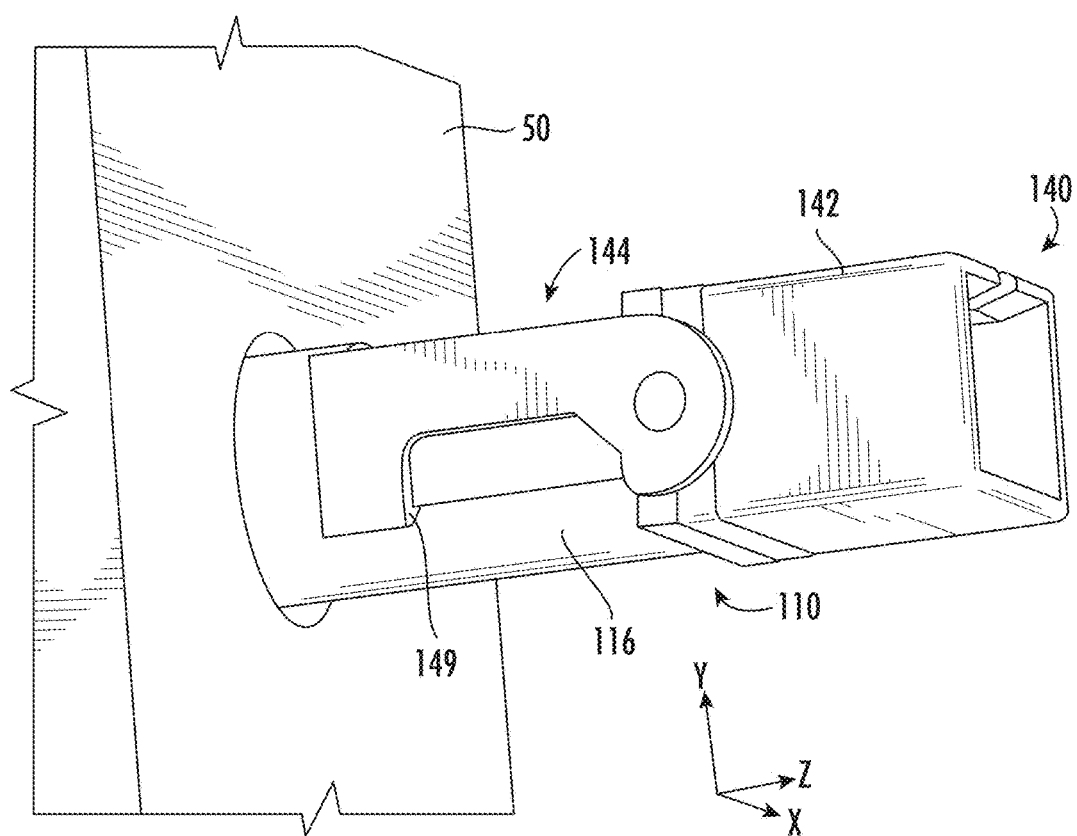
FIG. 14 schematically depicts a perspective view of the adapter member of FIG. 12 selectively coupled to the mounting member of FIG. 2A, according to one or more embodiments shown and described herein.

Referring to FIG. 14, a perspective view of the adapter member 140 coupled to the mounting member 110 is schematically depicted. In embodiments, the jacket engagement member 144 defines a mounting member retention face 149 that is repositionable between an engaged position and a disengaged position. In the engaged position, as shown in FIG. 14, the mounting member retention face 149 is oriented to face in the longitudinal direction and engages the mounting member 110 to selectively couple the adapter member 140 to the mounting member 110. More particularly, in the embodiment depicted in FIG. 14, the mounting member retention face 149 engages a feature of the mating member 116 of the mounting member 110 to selectively couple the adapter member 140 to the mounting member 110. Because the mounting member retention face 149 is oriented to face in the longitudinal direction in the engaged position, engagement between the mounting member retention face 149 and the mounting member 110 restricts movement of the adapter member 140 with respect to the mounting member 110 in the longitudinal direction. In the disengaged position, the mounting member retention face 149 is spaced apart from the mounting member 110 such that the adapter member 140 may be removed from the mounting member 110.

Referring to FIGS. 15 and 16, a perspective view of the sleeve 150 of the adapter member 140 (FIG. 14) is shown in isolation, and the sleeve 150 is shown with the ferrule 230 of the fiber optic cable 200 inserted within the sleeve 150, respectively. In embodiments, the sleeve 150 generally defines an inner perimeter 152 extending around the sleeve 150, and a ferrule engagement portion 154 positioned on the inner perimeter 152. As shown in FIG. 16, the ferrule engagement portion 154 is engaged with the ferrule 230 when the fiber optic cable 200 is inserted within the sleeve 150. More particularly, in embodiments, the ferrule engagement portion 154 may include a lip that extends inward from the inner perimeter 152 of the sleeve 150, and the lip may be engaged with the groove of the sleeve engagement portion 234 of the ferrule 230. Engagement between the ferrule engagement portion 154 of the sleeve 150 and the sleeve engagement portion 234 of the ferrule 230 restricts movement of the fiber optic cable 200 with respect to the sleeve 150, and accordingly the adapter member 140 (FIG. 14) in the longitudinal direction. In embodiments, the sleeve 150 and the ferrule engagement portion 154 may be formed by any suitable process, such as three-dimensional printing, or the like.

Figure 17:
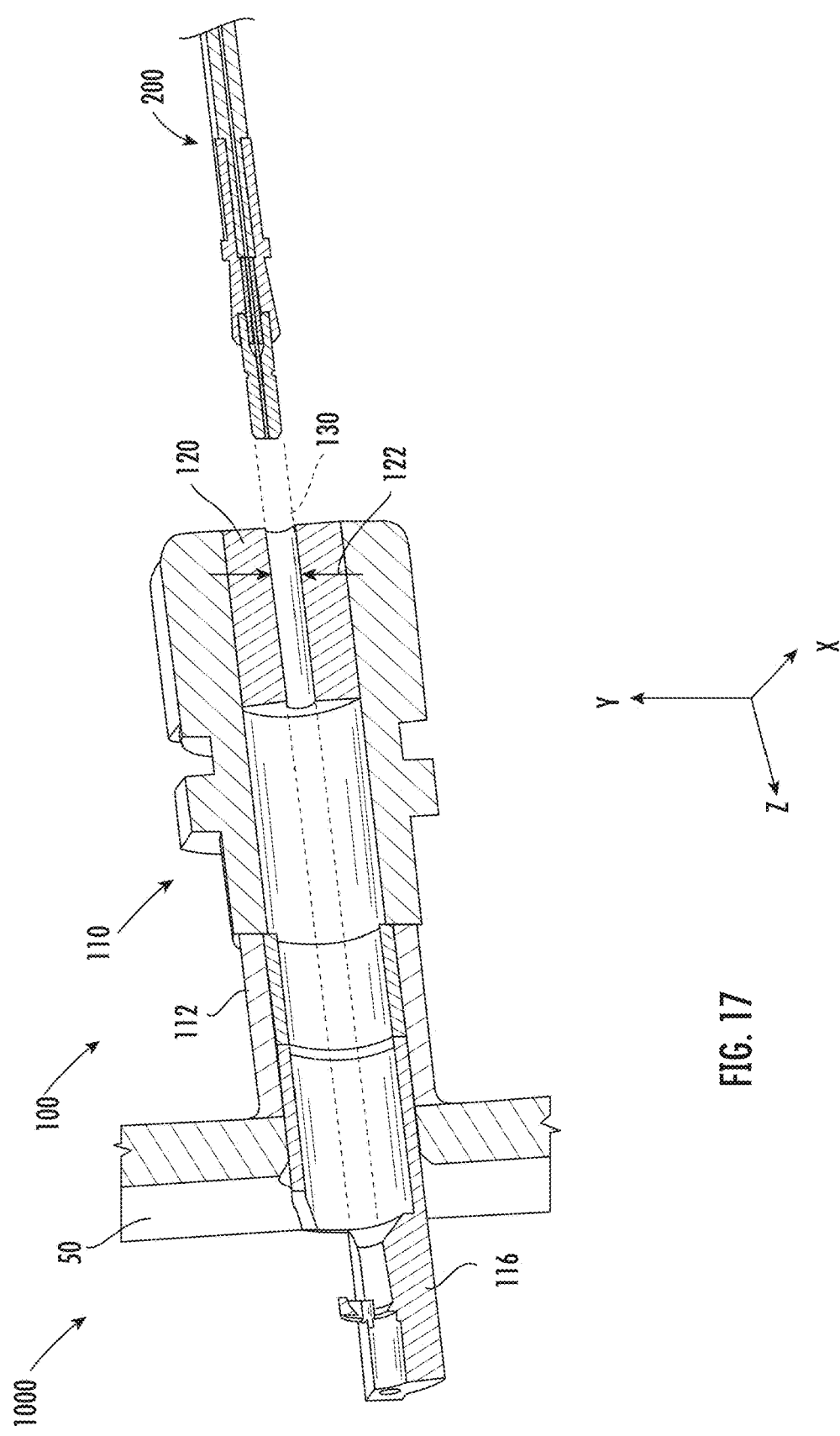
FIG. 17 schematically depicts a section view of a fiber optic cable approaching the mounting member of FIG. 2A, according to one or more embodiments shown and described herein.

Referring to FIG. 17, the assembly of the fiber optic junction 1000 is schematically depicted. Initially, the fiber optic cable 200 approaches the optical adapter assembly 100. In particular, the fiber optic cable 200 initially approaches the inner perimeter 122 of the annular grommet 120 in the longitudinal direction to be inserted along the fiber insertion path 130.

Figure 18:
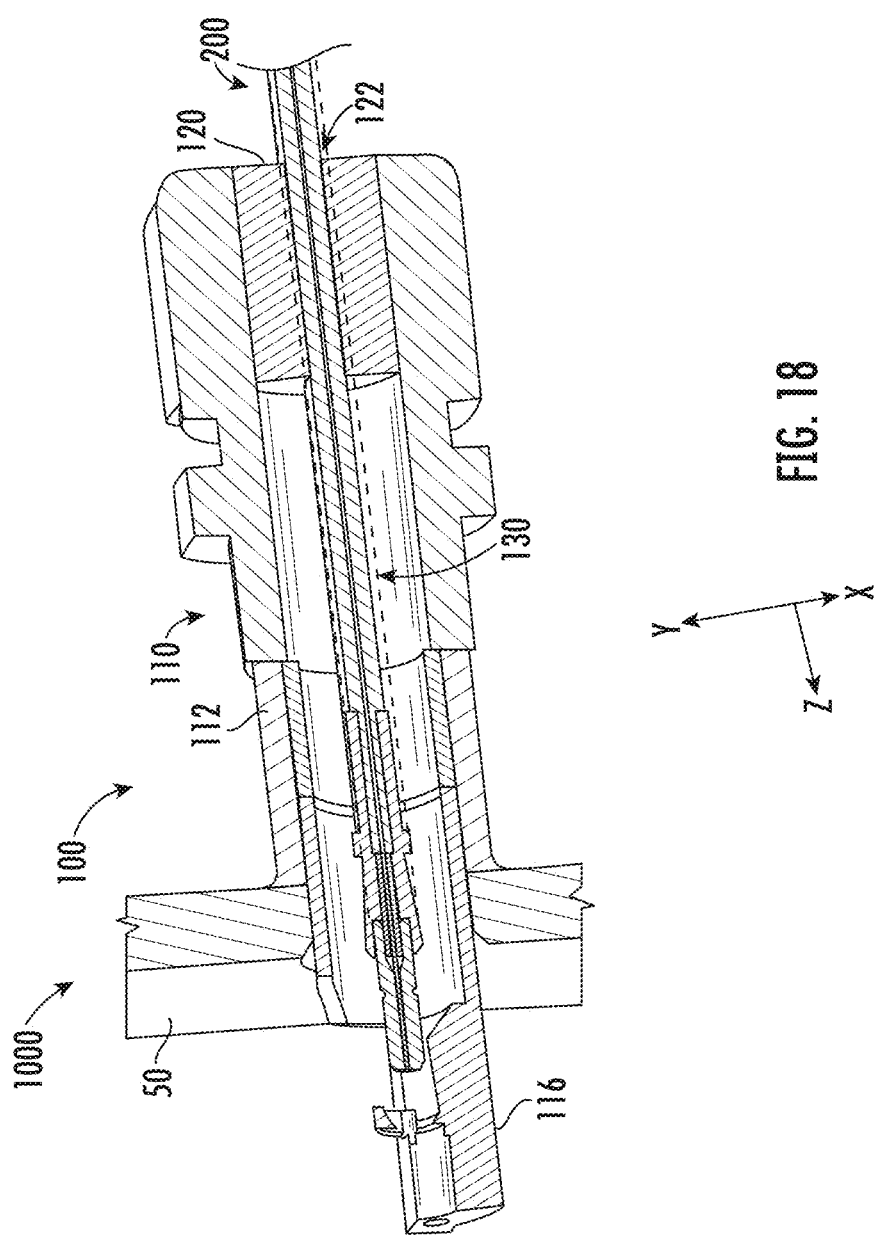
FIG. 18 schematically depicts a section view of the fiber optic cable partially inserted into the mounting member of FIG. 2A, according to one or more embodiments shown and described herein.

Referring to FIG. 18, the fiber optic cable 200 is depicted partially inserted within the optical adapter assembly 100. In particular, the fiber optic cable 200 is positioned within the inner perimeter 122 of the annular grommet 120 and is further inserted along the fiber insertion path 130.

Figure 19:
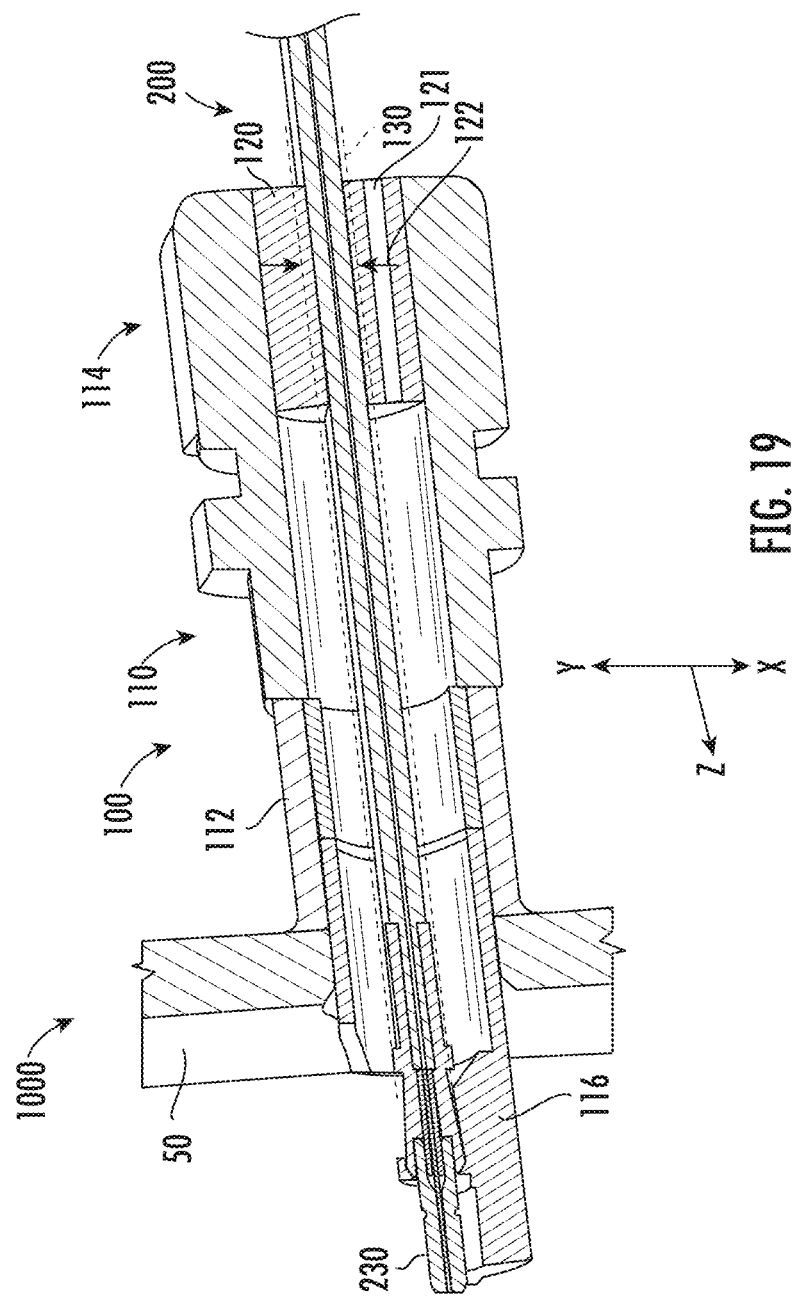
FIG. 19 schematically depicts a section view of the fiber optic cable fully inserted to the mounting member of FIG. 2A, according to one or more embodiments shown and described herein.

Referring to FIG. 19, the fiber optic cable 200 is depicted fully inserted within the mounting member 110. When fully inserted, the ferrule 230 of the fiber optic cable 200 may be positioned within the mating member 116 at the end of the mounting member 110 opposite the annular grommet 120. In some embodiments, a marking may be provided on the fiber optic cable that is configured to align with the annular grommet 120 in the longitudinal direction when the fiber optic cable 200 is fully inserted within the mounting member 110, to provide feedback to a user indicating when the fiber optic cable 200 is fully inserted within the mounting member 110. With the fiber optic cable 200 fully inserted within the mounting member 110, the locking member 114 may be repositioned from the expanded position to the constricted position, reducing the inner perimeter 122 of the annular grommet 120 to seal the fiber optic cable 200 within the mounting member 110. In some embodiments, a clear or translucent window 121 may be positioned on the annular grommet 120 to allow a user to visually confirm when a fiber optic cable 200 is fully inserted within the mounting member 110.

Figure 20A:
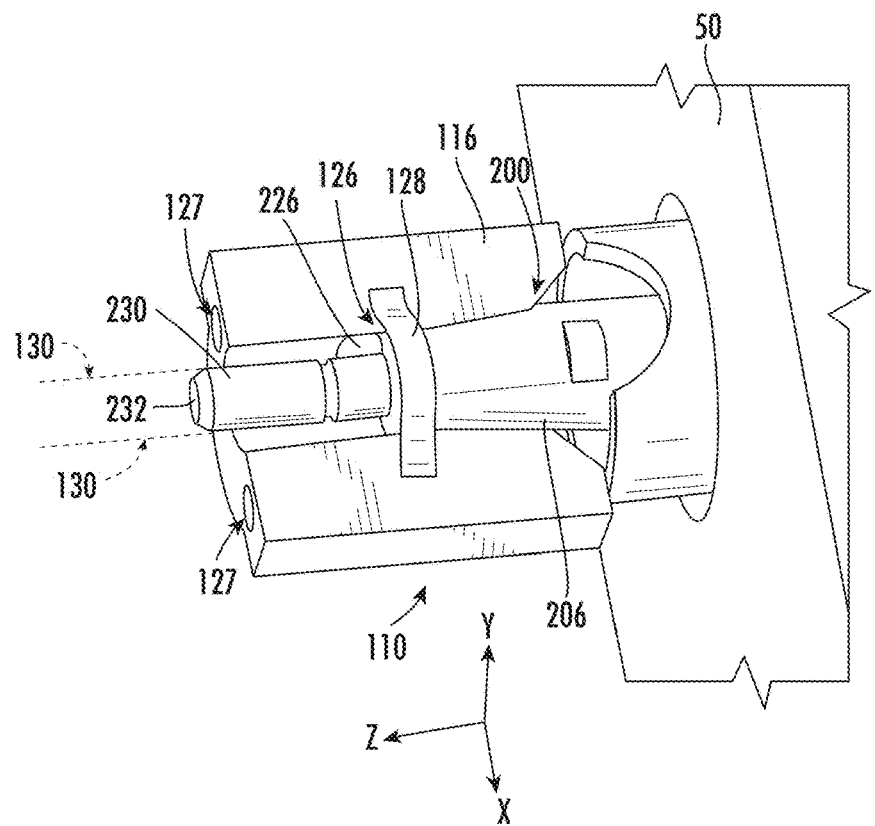
FIG. 20A schematically depicts a top perspective view of the fiber optic cable fully inserted to the mounting member of FIG. 2A, according to one or more embodiments shown and described herein.
Figure 20B:
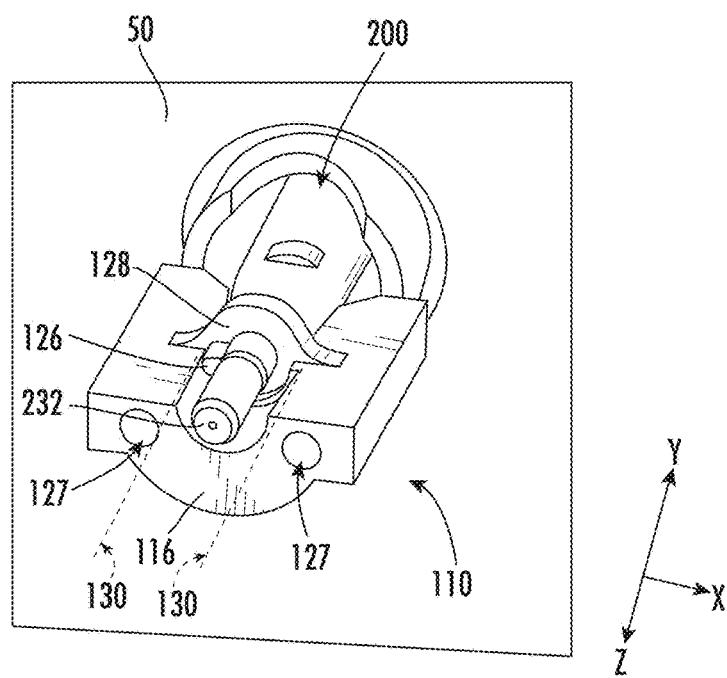
FIG. 20B schematically depicts a front perspective view the fiber optic cable fully inserted to the mounting member of FIG. 2A, according to one or more embodiments shown and described herein.

Referring to FIGS. 20A and 20B, a top and a front perspective view of the fiber optic cable 200 within the mating member 116 of the mounting member 110 are schematically depicted, respectively. In embodiments, the mating member 116 includes a stop member 128 positioned around the fiber insertion path 130. The stop member 128 engages the outer jacket 206 of the fiber optic cable 200 when the fiber optic cable 200 is fully inserted within the mounting member 110. In some embodiments, the stop member 128 may include an aperture such that the ferrule 230 may pass through the aperture, however, the outer jacket 206 of the fiber optic cable 200 does not pass through the aperture. Engagement between the stop member 128 and the outer jacket 206 of the fiber optic cable 200 prevents further insertion of the fiber optic cable 200 within the mounting member 110 (i.e., in the +z-direction as depicted). In some embodiments, engagement between the stop member 128 and the outer jacket 206 of the fiber optic cable 200 provides auditory and/or tactile feedback to a user inserting the fiber optic cable 200 within the mounting member 110 to indicate that the fiber optic cable 200 is fully inserted. In some embodiments, one or more portions of the mating member 116 may be clear or translucent such that a user may visually confirm that the outer jacket 206 of the fiber optic cable 200 is inserted within the mating member 116. Furthermore, as depicted in FIG. 20A, the end face 232 of the ferrule 230 may be exposed when the fiber optic cable 200 is fully inserted, such that the end face 232 may be cleaned of any debris before being engaged with an end face of an opposing ferrule.

In embodiments, the mating member 116 further includes a rotationally discrete fiber alignment member 126 positioned adjacent the fiber insertion path 130. When the fiber optic cable 200 is fully inserted within the mounting member 110, the rotationally discrete alignment portion 226 of the fiber optic cable 200 engages the rotationally discrete fiber alignment member 126. In embodiments, the rotationally discrete fiber alignment member 126 may generally include an aperture through which the rotationally discrete alignment portion 226 of the fiber optic cable 200 may pass. Engagement between the rotationally discrete fiber alignment member 126 of the mounting member 110 and the rotationally discrete alignment portion 226 of the fiber optic cable 200 restricts rotation of the fiber optic cable 200 with respect to the mounting member 110 about the longitudinal direction. Accordingly, via the rotationally discrete fiber alignment member 126 and the stop member 128 of the mounting member 110, movement of the fiber optic cable 200 in the longitudinal direction (e.g., in the +z-direction as depicted) and about the longitudinal direction is restricted when the fiber optic cable 200 is fully inserted within the mounting member 110.

Figure 21:
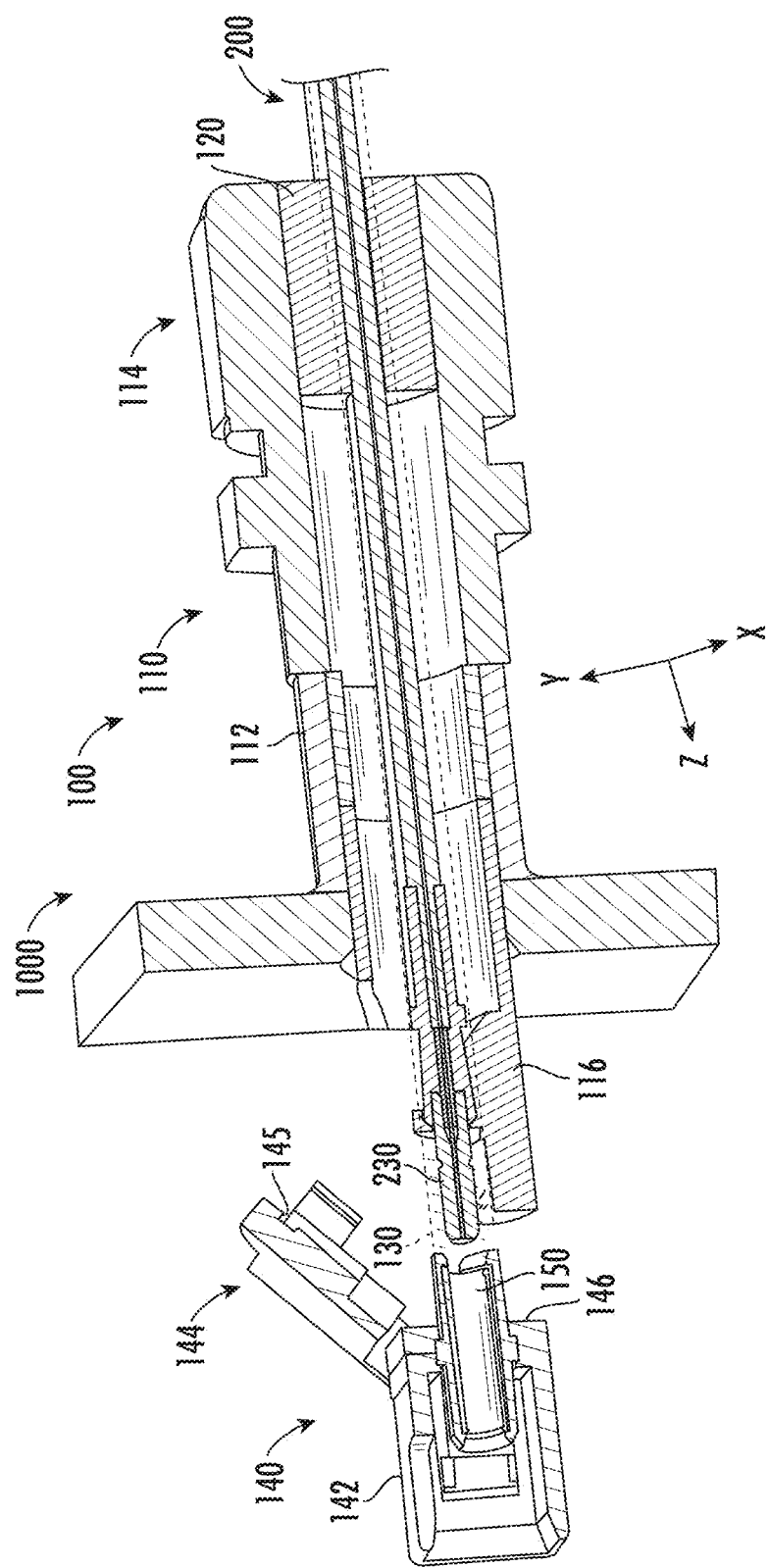
FIG. 21 schematically depicts the adapter member approaching the mounting member of FIG. 19, according to one or more embodiments shown and described herein.

Referring to FIG. 21, with the fiber optic cable 200 fully inserted within the mounting member 110, the adapter member 140 is inserted onto the mounting member 110. More particularly, the sleeve 150 of the adapter member 140 is aligned with the ferrule 230 of the fiber optic cable 200, and the mounting member engagement portion 146 of the adapter member 140 is aligned to face in the longitudinal direction to engage the mounting member 110. As the adapter member 140 approaches the mounting member, the jacket engagement member 144 is positioned in the disengaged position such that the jacket engagement face 145 is spaced apart from the fiber insertion path 130.

Figure 22:
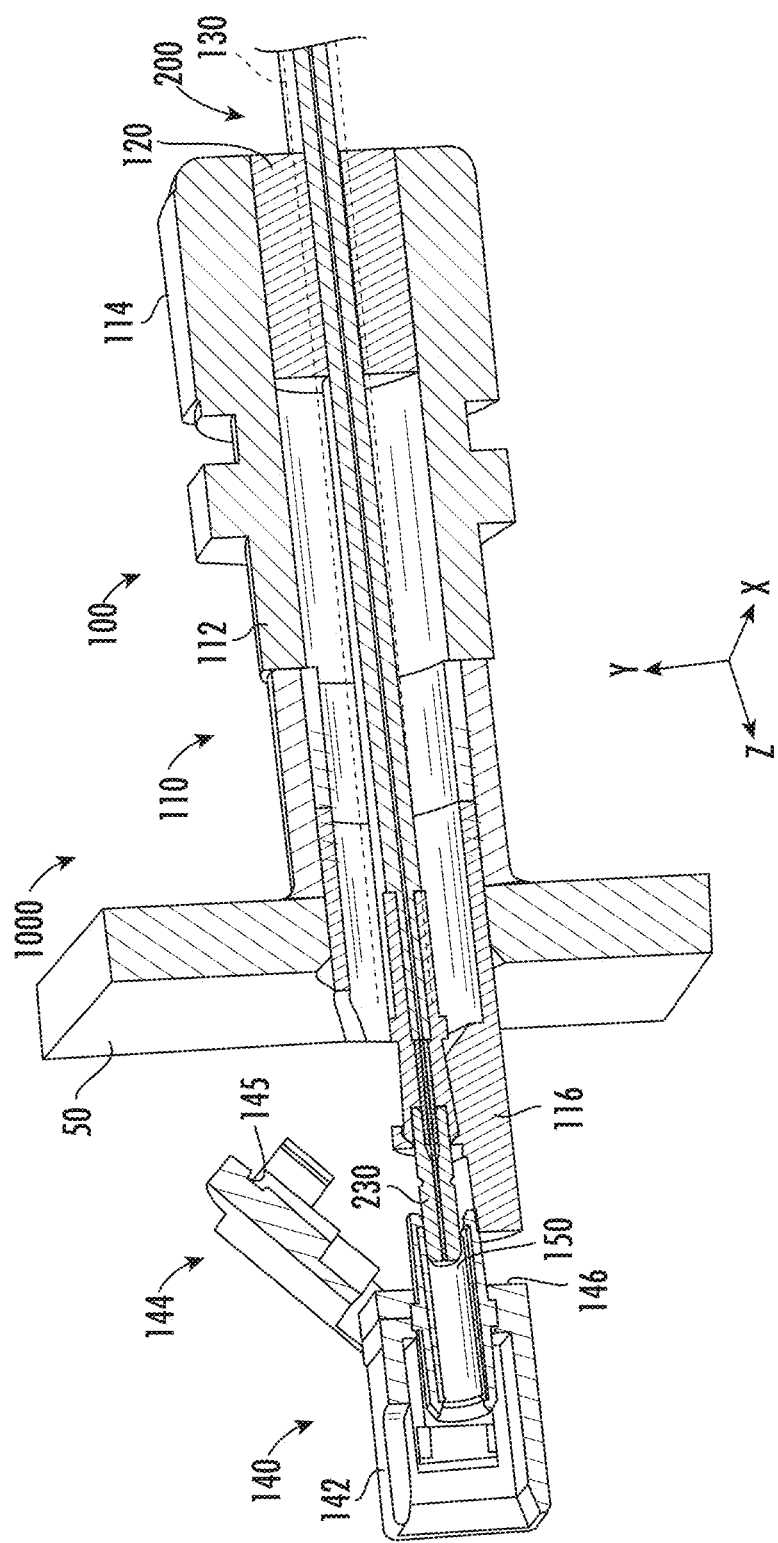
FIG. 22 schematically depicts the sleeve of the adapter member of FIG. 21 engaged with the ferrule of the fiber optic cable of FIG. 21, according to one or more embodiments shown and described herein.
Figure 23:
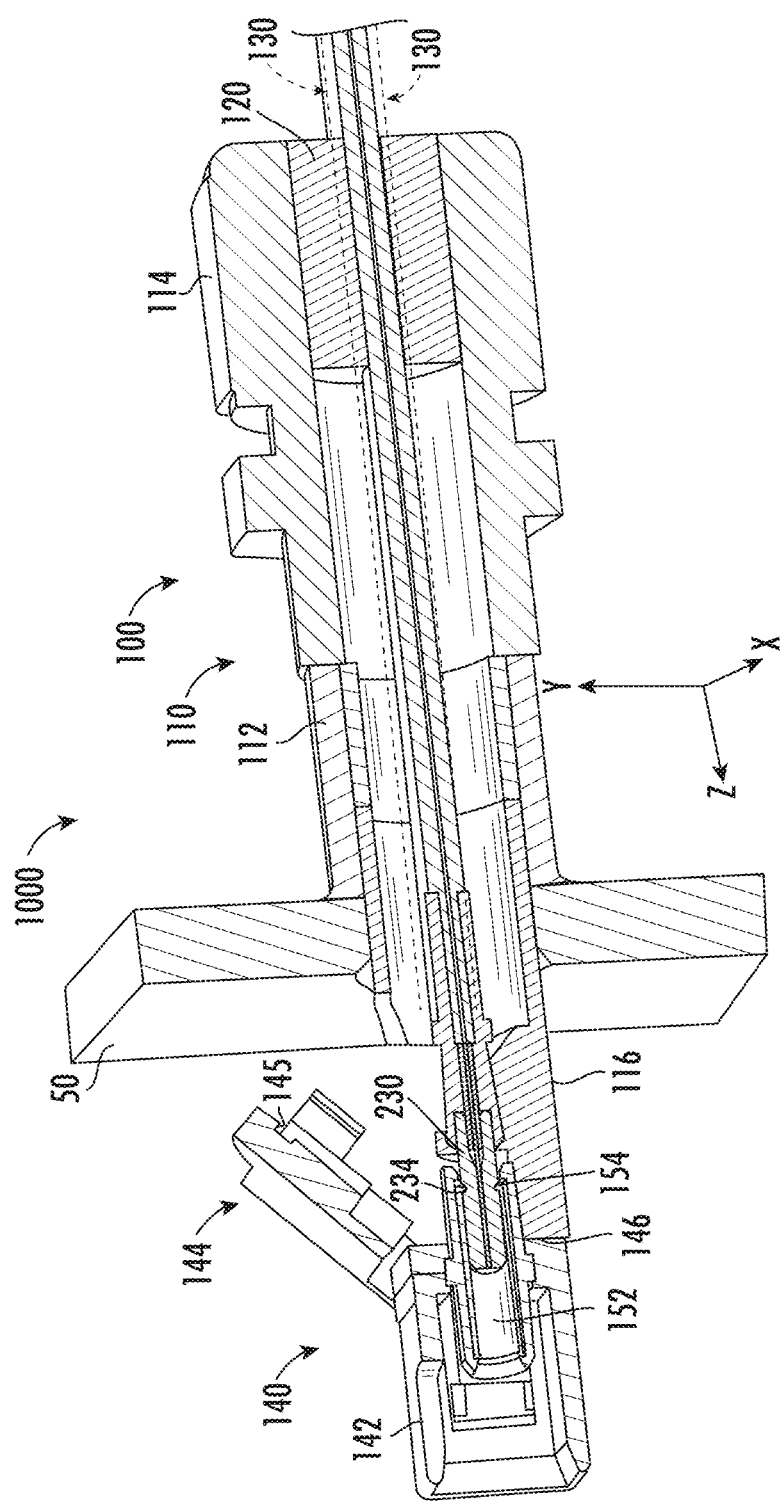
FIG. 23 schematically depicts the adapter member of FIG. 22 fully inserted over the ferrule of the fiber optic cable of FIG. 22, according to one or more embodiments shown and described herein.

Referring to FIGS. 22 and 23, as the adapter member 140 approaches the mounting member 110, the sleeve 150 is positioned around the ferrule 230 of the fiber optic cable 200. As shown in FIG. 22, when the adapter member 140 is fully inserted onto the mounting member 110, the ferrule engagement portion 154 of the sleeve 150 is engaged with the sleeve engagement portion 234 of the ferrule 230, such that the sleeve 150 of the adapter member 140 is fixed with respect to the ferrule 230 of the fiber optic cable 200 in the longitudinal direction.

As depicted in FIG. 23, when the adapter member 140 is fully inserted onto the mounting member 110, the mounting member engagement portion 146 is engaged with the mounting member 110, and more particularly the, mating member 116 of the mounting member 110. Furthermore, when the mounting member engagement portion 146 is engaged with the mounting member 110, the at least one alignment feature 148 (FIG. 13) of the adapter member 140 is engaged with the holes 127 (FIG. 20B) of the mating member 116. As described above, engagement between the mounting member engagement portion 146 and the mounting member 110 restricts movement of the adapter member 140 with respect to the mounting member in the longitudinal direction (e.g., in the −z-direction as depicted). Furthermore, engagement between the at least one alignment feature 148 (FIG. 13) and the holes 127 (FIG. 20B) of the mating member restrict rotation of the adapter member 140 with respect to the mating member 116 about the longitudinal direction.

Figure 24:
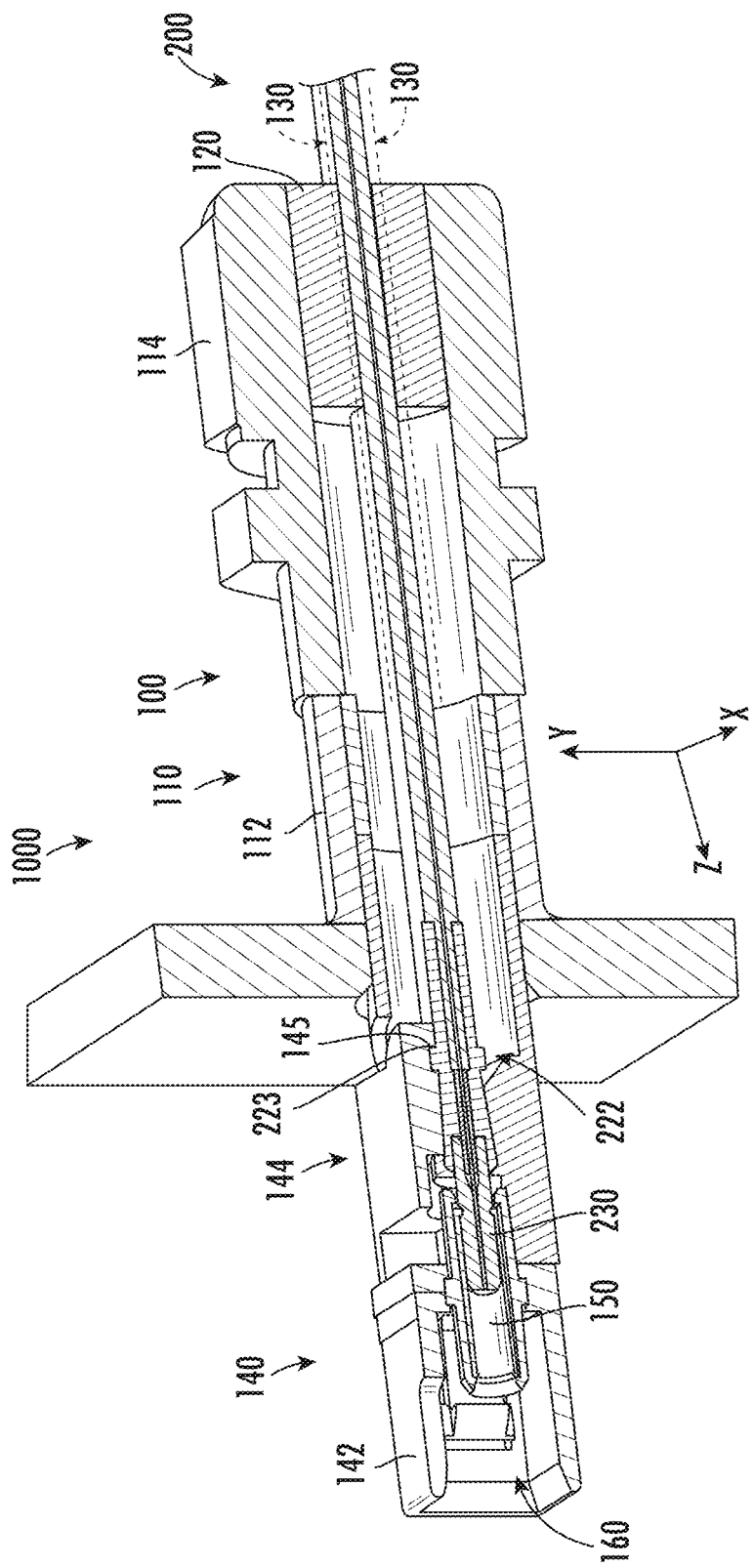
FIG. 24 schematically depicts the adapter member of FIG. 23 selectively coupled to the mounting member of FIG. 23, according to one or more embodiments shown and described herein.

Referring to FIG. 24, with the adapter member 140 fully inserted onto the mounting member 110, the jacket engagement member 144 is moved from the disengaged position into the engaged position. More particularly, the jacket engagement member 144 is pivoted with respect to the adapter housing 142 to position the jacket engagement face 145 within the fiber insertion path 130. With the jacket engagement face 145 within the fiber insertion path 130, the jacket engagement face 145 engages the adapter engagement face 223 of the outer jacket 206 of the fiber optic cable 200. As noted above, the adapter engagement face 223 is oriented to face in the longitudinal direction. When the jacket engagement member 144 is in the engaged position, the jacket engagement face 145 is also oriented to face in the longitudinal direction, such that engagement between the jacket engagement face 145 and the adapter engagement face 223 restricts movement of the outer jacket 206 of the fiber optic cable 200 with respect to the adapter member 140 in the longitudinal direction (e.g., in the −z-direction as depicted).

Accordingly, movement of the ferrule 230 and the outer jacket 206 of the fiber optic cable 200 with respect to the adapter member 140 in the longitudinal direction is restricted via the ferrule engagement portion 154 of the sleeve 150 and the jacket engagement face 145 of the jacket engagement member 144. Further, movement of the adapter member 140 with respect to the mounting member 110 in the longitudinal direction is restricted via the mounting member engagement portion 146. In this way, the mounting member 110 and the adapter member 140 may rigidly hold the ferrule 230 of the fiber optic cable 200 in the longitudinal direction when another ferrule of fiber optic cable to be optically coupled to the fiber optic cable 200 is inserted into the receiving side 160 of the adapter member 140. In this way, the ferrule 230 of the fiber optic cable 200 may behave in a similar manner to the female optical connector 20 (FIG. 1C). For example, even if the fiber optic cable 200 were configured to buckle similar to the male optical connector 10 (FIG. 1C), because the mounting member 110 and the adapter member 140 rigidly hold the ferrule 230 of the fiber optic cable 200 in the longitudinal direction, the fiber optic cable 200 may behave similar to the female optical connector 20 (FIG. 1C), e.g. without buckling of the optical fiber 202 (FIG. 3), when the ferrule 230 is engaged with a ferrule of another fiber optic cable inserted into the receiving side 160 of the adapter member 140.

In this way, the optical adapter assembly 100 may allow the connection of a pair of fiber optic cables in a male-female configuration as described above with respect to FIG. 1C, even if both of the fiber optic cables are configured as male optical connectors 10 (FIG. 1C). By allowing the connection of a pair of fiber optic cables in the male-female configuration regardless of whether both of the fiber optic cables are configured as male optical connectors 10 (FIG. 1C), the optical adapter assembly 100 may reduce the types of optical connector configurations that may be required in a network. For example, the optical adapter assembly 100 may permit fiber optic cables to be connected in the male-female configuration even if all of the fiber optic cables in the network are configured as male optical connectors 10 (FIG. 1C). Furthermore, through the optical adapter assembly 100, interconnectivity issues that would otherwise arise through the connection of a pair of female optical connectors 20 (FIG. 1C) may be avoided. For example, since the optical adapter assembly 100 may allow the connection of fiber optic cables in a male-female configuration even if both fiber optic cables are configured as male optical connectors 10 (FIG. 1C), then a network may be designed not to have any fiber optic cables that are configured as female optical connectors 20 (FIG. 1C), but may rather rely on the optical adapter assembly 100 to connect the fiber optic cables in the male-female configuration between fiber optic cables that are both configured as male optical connectors (FIG. 1C). By eliminating fiber optic cables that are configured as female optical connectors 20 (FIG. 1C) in a network, the interconnectivity issues that would arise from connecting a pair of female optical connectors 20 (FIG. 1C) may be eliminated.

Accordingly, optical adapter assemblies according to the present disclosure generally include a mounting member and an adapter member that is selectively coupled to the mounting member. The adapter member may be selectively coupled to a fiber optic cable positioned within the mounting member and may restrict movement of the fiber optic cable with respect to the mounting member in a longitudinal direction. Because the adapter member restricts movement of the fiber optic cable within the mounting member in the longitudinal direction, engagement forces applied to the fiber optic cable by a second fiber optic cable optically coupled to the fiber optic cable within the mounting member may be managed.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical adapter assembly comprising:
   a mounting member comprising a mounting housing extending in a longitudinal direction and defining a fiber insertion path that extends in the longitudinal direction; and
   an adapter member selectively coupled to the mounting member, the adapter member comprising:
      an adapter housing extending in the longitudinal direction;
      a jacket engagement member that is selectively repositionable within the fiber insertion path and that is structurally configured to engage an outer jacket of a fiber optic cable positioned within the fiber insertion path;
      a sleeve positioned at least partially within the adapter housing and extending around the fiber insertion path; and
      a mounting member engagement portion that is engaged with the mounting member and that restricts movement of the adapter member with respect to the mounting member in the longitudinal direction.

2. The optical adapter assembly of claim 1, wherein the sleeve of the adapter member further comprises an inner perimeter and a lip that extends inward from the inner perimeter.

3. The optical adapter assembly of claim 1, wherein the jacket engagement member defines a jacket engagement face, wherein the jacket engagement face is repositionable between an engaged position, in which the jacket engagement face is positioned within the fiber insertion path and oriented to face in the longitudinal direction, and a disengaged position, in which the jacket engagement face is positioned outside of the fiber insertion path.

4. The optical adapter assembly of claim 1, wherein the jacket engagement member is pivotally coupled to the adapter housing.

5. The optical adapter assembly of claim 1, wherein the jacket engagement member defines a mounting member retention face that is repositionable between an engaged position, in which the mounting member retention face engages the mounting member and is oriented to face in the longitudinal direction, and a disengaged position, in which the mounting member retention face is spaced apart from the mounting member.

6. The optical adapter assembly of claim 1, wherein the adapter member further comprises at least one alignment feature that is engaged with the mounting member, and the at least one alignment feature inhibits rotation of the adapter member with respect to the mounting member about the longitudinal direction.

7. The optical adapter assembly of claim 1, wherein the mounting member engagement portion of the adapter member comprises an engagement face that is oriented to face in the longitudinal direction.

8. The optical adapter assembly of claim 1, wherein the mounting member further comprises a stop member positioned around the fiber insertion path, the stop member being structurally configured to engage the outer jacket of the fiber optic cable.

9. The optical adapter assembly of claim 1, wherein the mounting member further comprises a rotationally discrete fiber alignment member positioned adjacent to the fiber insertion path, the rotationally discrete fiber alignment member being structurally configured to engage a rotationally discrete alignment portion of the fiber optic cable.

10. The optical adapter assembly of claim 1, wherein the mounting member further comprises a mating member positioned within the mounting housing, and wherein the mating member engages the adapter member.

11. The optical adapter assembly of claim 10, wherein the mating member comprises a stop member that is positioned around the fiber insertion path, the stop member being structurally configured to engage the outer jacket of the fiber optic cable.

12. The optical adapter assembly of claim 10, wherein the mating member comprises a rotationally discrete fiber alignment member positioned adjacent to the fiber insertion path.

13. The optical adapter assembly of claim 10, wherein the mounting member further comprises an elastic member positioned within the mounting housing.

14. The optical adapter assembly of claim 10, wherein the mounting member further comprises a resilient member positioned within the mounting housing.

15. A fiber optic junction comprising:
    a fiber optic cable comprising:
       an outer jacket;

an optical fiber positioned at least partially within the outer jacket; and
a ferrule positioned at an end of the optical fiber, wherein the ferrule extends around the optical fiber; and
an optical adapter assembly comprising:
a mounting member comprising:
a mounting housing extending in a longitudinal direction and defining a fiber insertion path that extends in the longitudinal direction and around at least a portion of the fiber optic cable; and
an adapter member selectively coupled to the mounting member, the adapter member comprising:
an adapter housing extending in the longitudinal direction;
a jacket engagement member that is selectively repositionable within the fiber insertion path and that is selectively engagable with the outer jacket of the fiber optic cable;
a sleeve positioned at least partially within the adapter housing and extending around the ferrule of the fiber optic cable; and
a mounting member engagement portion that is engaged with the mounting member and that restricts movement of the adapter member with respect to the mounting member in the longitudinal direction.

16. The fiber optic junction of claim 15, wherein the sleeve of the adapter member further comprises an inner perimeter and ferrule engagement portion positioned on the inner perimeter, wherein the ferrule engagement portion is engaged with the ferrule.

17. The fiber optic junction of claim 16, wherein the ferrule engagement portion comprises a lip extending inward from the inner perimeter of the sleeve.

18. The fiber optic junction of claim 16, wherein the ferrule defines an outer perimeter and a sleeve engagement portion positioned on the outer perimeter, and wherein the sleeve engagement portion is engaged with the ferrule engagement portion of the sleeve, restricting movement of the ferrule with respect to the sleeve in the longitudinal direction.

19. The fiber optic junction of claim 18, wherein the sleeve engagement portion comprises a groove extending into the outer perimeter of the ferrule.

20. The fiber optic junction of claim 15, wherein the outer jacket of the fiber optic cable defines a nominal portion and an engagement portion that extends outward from the nominal portion of the outer jacket.

21. The fiber optic junction of claim 20, wherein the engagement portion of the outer jacket defines an adapter engagement face that is oriented to face in the longitudinal direction.

22. The fiber optic junction of claim 20, wherein the jacket engagement member defines a jacket engagement face, wherein the jacket engagement face is repositionable between an engaged position, in which the jacket engagement face is oriented to face in the longitudinal direction and is engaged with the engagement portion of the outer jacket of the fiber optic cable, and a disengaged position, in which the jacket engagement face is spaced apart from the engagement portion of the outer jacket of the fiber optic cable.

23. The fiber optic junction of claim 15, wherein the jacket engagement member is pivotally coupled to the adapter housing.

24. The fiber optic junction of claim 15, wherein the jacket engagement member defines a mounting member retention face that is repositionable between an engaged position, in which the mounting member retention face engages the mounting member and is oriented to face in the longitudinal direction, and a disengaged position, in which the mounting member retention face is spaced apart from the mounting member.

25. The fiber optic junction of claim 15, wherein the adapter member further comprises at least one alignment feature that is engaged with the mounting member, and the at least one alignment feature restricts rotation of the adapter member with respect to the mounting member about the longitudinal direction.

26. The fiber optic junction of claim 15, wherein the mounting member engagement portion of the adapter member comprises an engagement face that is oriented to face in the longitudinal direction.

27. The fiber optic junction of claim 15, wherein the mounting member further comprises a stop member positioned around the fiber insertion path and engaged with the outer jacket of the fiber optic cable such that movement of the outer jacket of the fiber optic cable with respect to the mounting member is restricted in the longitudinal direction.

28. The fiber optic junction of claim 15, wherein the mounting member further comprises a rotationally discrete fiber alignment member positioned adjacent to the fiber insertion path, and wherein the fiber optic cable further comprises a rotationally discrete alignment portion, and wherein the rotationally discrete fiber alignment member of the mounting member is engaged with the rotationally discrete alignment portion of the fiber optic cable and restricts rotation of the fiber optic cable with respect to the mounting member about the longitudinal direction.

29. The fiber optic junction of claim 15, wherein the mounting member further comprises a mating member positioned within the mounting housing, wherein the mating member engages the outer jacket of the fiber optic cable.

30. The fiber optic junction of claim 29, wherein the mating member comprises a stop member positioned around the fiber insertion path and engaged with the outer jacket of the fiber optic cable such that movement of the outer jacket of the fiber optic cable with respect to the mounting member is restricted in the longitudinal direction.

31. The fiber optic junction of claim 29, wherein the mating member comprises a rotationally discrete fiber alignment member positioned adjacent to the fiber insertion path, and wherein the fiber optic cable further comprises a rotationally discrete alignment portion, and wherein the rotationally discrete fiber alignment member of the mounting member is engaged with the rotationally discrete alignment portion of the fiber optic cable and restricts rotation of the fiber optic cable with respect to the mounting member about the longitudinal direction.

32. The fiber optic junction of claim 15, wherein the mounting member further comprises an elastic member positioned within the mounting housing.

33. The fiber optic junction of claim 15, wherein the mounting member further comprises a resilient member positioned within the mounting housing.

34. The fiber optic junction of claim 15, wherein the mounting member further comprises an annular grommet positioned within the mounting housing and defining an inner perimeter that surrounds the fiber optic cable.

35. The fiber optic junction of claim 34, wherein the mounting member further comprises a locking member engaged with the annular grommet, the locking member being repositionable between a constricted position, in which the locking member moves the annular grommet such that the annular grommet engages the fiber optic cable and seals the fiber optic cable within the mounting member, and an expanded position, in which the locking member engages the annular grommet such that the annular grommet allows the fiber optic cable to move with respect to the mounting member in the longitudinal direction.

36. The fiber optic junction of claim 34, further comprising a cable bending support engaged with the fiber optic cable and positioned at an interface between the fiber optic cable and the annular grommet.

37. A method for forming a fiber optic junction, the method comprising:
- inserting a fiber optic cable along a fiber insertion path of a mounting member including an annular grommet positioned around the fiber insertion path;
- engaging an outer jacket of the fiber optic cable with a stop member of the mounting member, wherein the stop member restricts further insertion of the fiber optic cable along the fiber insertion path;
- engaging a rotationally discrete alignment portion of the fiber optic cable with a rotationally discrete fiber alignment member of the mounting member positioned adjacent to the fiber insertion path, wherein the rotationally discrete fiber alignment member restricts rotation of the fiber optic cable with respect to the mounting member about a longitudinal direction extending along the fiber insertion path;
- engaging the outer jacket of the fiber optic cable with a jacket engagement member of an adapter member that restricts movement of the outer jacket of the fiber optic cable with respect to the adapter member in the longitudinal direction, wherein the jacket engagement member is selectively repositionable within the fiber insertion path; and
- engaging a mounting member engagement portion of the adapter member with the mounting member to restrict movement of the adapter member with respect to the mounting member in the longitudinal direction.

38. The method of claim 37, further comprising engaging a mounting member retention face of the adapter member with the mounting member to selectively couple the adapter member to the mounting member.

39. The method of claim 37, further comprising constricting an inner perimeter of the annular grommet around the fiber optic cable to seal the fiber optic cable within the mounting member.

40. The method of claim 37, further comprising inserting a ferrule of the fiber optic cable within a sleeve of the adapter member.

41. The method of claim 40, further comprising engaging a lip of the sleeve with a groove of the ferrule of the fiber optic cable.

* * * * *